(12) United States Patent
Resnick et al.

(10) Patent No.: US 12,349,700 B2
(45) Date of Patent: Jul. 8, 2025

(54) INGREDIENT BLENDING SYSTEM AND METHOD

(71) Applicant: Forte Supply LLC, Loveland, CO (US)

(72) Inventors: Jeffrey D. Resnick, Dallas, TX (US); Tyler Hawker, Timnath, CO (US); David Resnick, Dallas, TX (US)

(73) Assignee: Forte Supply LLC, Loveland, CO (US)

( * ) Notice: Subject to any disclaimer, the term of this patent is extended or adjusted under 35 U.S.C. 154(b) by 0 days.

(21) Appl. No.: 19/023,706

(22) Filed: Jan. 16, 2025

(65) Prior Publication Data
US 2025/0151749 A1    May 15, 2025

Related U.S. Application Data

(63) Continuation-in-part of application No. 17/899,812, filed on Aug. 31, 2022, now Pat. No. 12,201,123.

(51) Int. Cl.
| | |
|---|---|
| A23G 9/28 | (2006.01) |
| A23G 9/16 | (2006.01) |
| A23G 9/20 | (2006.01) |
| A23G 9/22 | (2006.01) |
| A23G 9/30 | (2006.01) |
| B01F 33/84 | (2022.01) |
| B01F 35/11 | (2022.01) |
| B01F 35/21 | (2022.01) |
| B01F 35/71 | (2022.01) |
| B01F 101/13 | (2022.01) |

(52) U.S. Cl.
CPC ............... *A23G 9/28* (2013.01); *A23G 9/166* (2013.01); *A23G 9/20* (2013.01); *A23G 9/228* (2013.01); *A23G 9/30* (2013.01); *B01F 33/84* (2022.01); *B01F 35/11* (2022.01); *B01F 35/2113* (2022.01); *B01F 35/718* (2022.01); *B01F 2101/13* (2022.01)

(58) Field of Classification Search
CPC ........................................................ A23G 9/28
USPC ............. 366/162.1; 222/145.5; 137/602, 896
See application file for complete search history.

(56) References Cited

U.S. PATENT DOCUMENTS

| | | | | |
|---|---|---|---|---|
| 5,700,494 | A | * | 12/1997 | Masse ..................... A23G 9/283 426/516 |
| 8,636,029 | B2 | * | 1/2014 | Ott ......................... B05B 12/14 239/303 |
| 2022/0183499 | A1 | | 6/2022 | Brothers |

* cited by examiner

*Primary Examiner* — David L Sorkin
(74) *Attorney, Agent, or Firm* — H. Brock Kolls

(57) ABSTRACT

An ingredient blending system for food and beverage applications incorporates a manifold body with a blending chamber, ingredient inlet ports, egress ports, and ingress ports to facilitate ratiometric mixing of multiple ingredients. The system employs a pump connected to an egress port to create suction, eliminating the need for positive pressure pumps at the inlet. Valve caps maintain selected ports in a permanently open state, enabling fluid communication for continuous flow, while electronic valves provide selective control. The system supports dynamic ingredient flow control, with configurations allowing pressure sensors to monitor ingredient flow or be replaced by sensor caps for simplicity. The blending chamber achieves precise mixing ratios based on port dimensions and supports diverse ingredient types, such as liquids and gases. Designed for scalability, the system enables efficient cleaning and maintenance, making it suitable for high-demand environments like frozen beverage or soft-serve ice cream equipment.

20 Claims, 16 Drawing Sheets

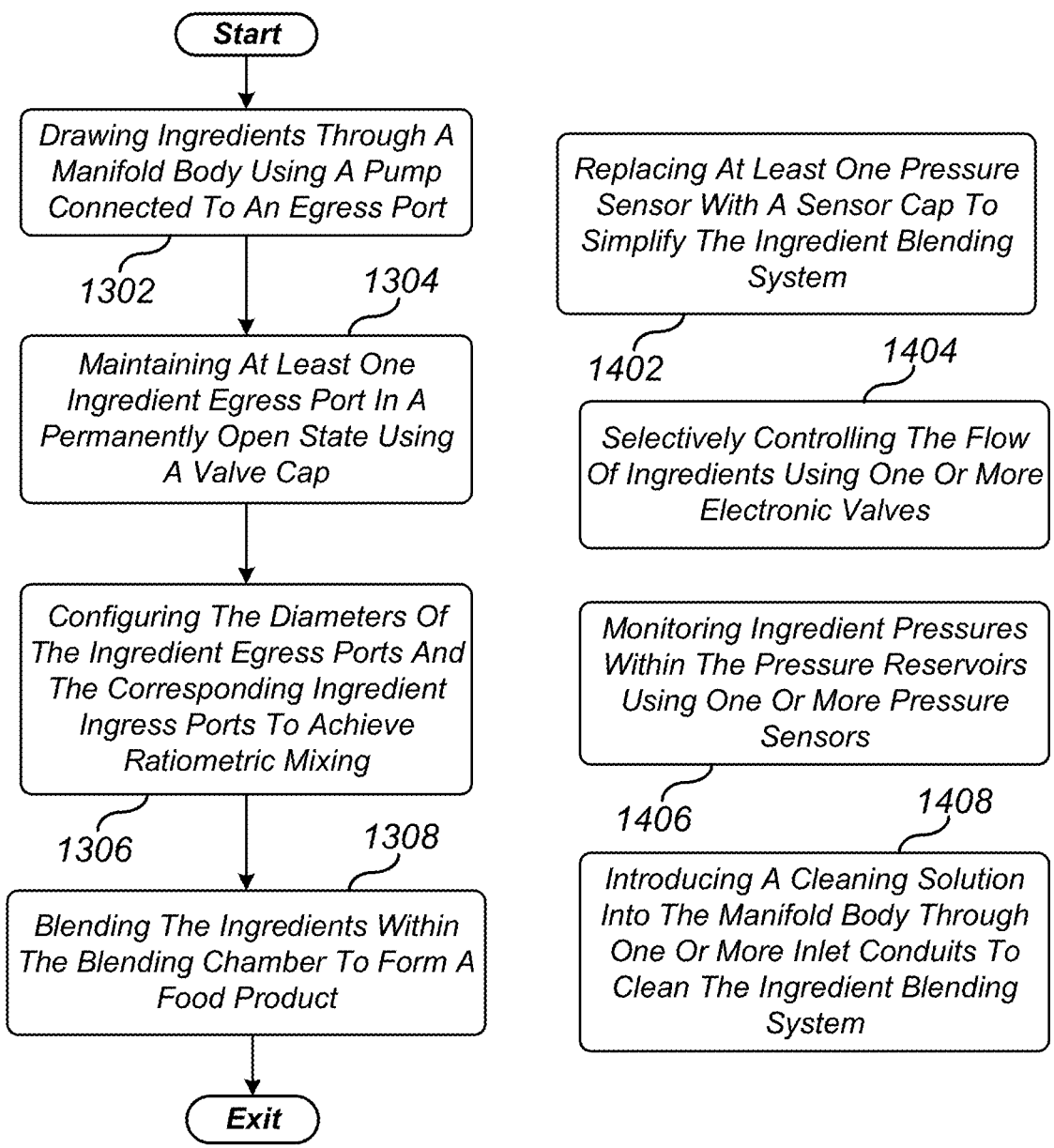

INGREDIENT BLENDING SYSTEM AND METHOD

CROSS-REFERENCE TO RELATED APPLICATIONS

This application contains subject matter which is related to the subject matter of the following application. The below-listed application is hereby incorporated herein by reference in its entirety:

This is a U.S. non-provisional application that is a continuation in part of a U.S. non-provisional application Ser. No. 17/899,812, inventor Jeffrey D. Resnick, entitled "INGREDIENT BLENDING SYSTEM AND METHOD", filed Aug. 31, 2022, now U.S. Pat. No. 12,201,123.

TECHNICAL FIELD OF THE INVENTION

The present invention relates to ingredient blending systems for food and beverage applications, specifically systems designed to blend multiple ingredients with precise ratios in frozen beverage and soft-serve ice cream equipment. The invention incorporates a manifold body, suction-based operation, and dynamic flow control mechanisms, such as valve caps, electronic valves, and pressure sensors or caps, to simplify system complexity and improve efficiency. This invention addresses challenges in ingredient mixing by enabling flexible configurations for diverse ingredient types, such as liquids and gases, while ensuring operational reliability and ease of maintenance.

BACKGROUND OF THE INVENTION

Before our invention, it was common to connect various ingredient supply lines to a mixing cylinder. The ingredients were injected in various ratios and the combination was stirred with an agitator to mix the ingredients. Shortcomings of this approach were that the ingredients took time to thoroughly blend and in applications where products were quickly dispensed from the mixing cylinder for consumption it was not uncommon for a customer to receive a poorly mixed product.

Another shortcoming is that often product variations required different ingredients to be mixed to form different food products. As such, it is difficult to connect numerous ingredient supply lines to a mixing cylinder and in equipment having multiple mixing cylinders the problem is other multiplied.

Another shortcoming is that in systems that do attempt to use many ingredient supply lines when it is time to clean the system it takes an inordinate amount of time to clean-in-place each ingredient supply line.

Traditional systems often relied on positive pressure pumps to deliver ingredients, which required complex and costly mechanisms to regulate flow. These systems increased operational complexity and maintenance requirements, particularly when dealing with diverse ingredient types such as liquids and gases. Additionally, such systems struggled to achieve precise ingredient ratios, leading to inconsistencies in the final product quality.

The use of electronic valves in previous systems added another layer of complexity, requiring sophisticated controls to manage ingredient flow. While effective in some applications, these systems often failed to balance efficiency with reliability, especially in high-demand environments where multiple ingredients needed to be mixed simultaneously.

Moreover, existing systems lacked scalability and flexibility. For example, adapting to different ingredient ratios or integrating additional ingredient lines often necessitated extensive system modifications, making it challenging to meet evolving product requirements.

Another limitation was the inability to dynamically control ingredient flow in real-time while minimizing downtime during maintenance or cleaning. Cleaning systems with multiple ingredient supply lines and complex configurations often required prolonged shutdowns, resulting in decreased productivity and increased labor costs.

The present invention addresses these and other shortcomings by providing an ingredient blending manifold system and method that improves food product quality, variety, and operational efficiency. By employing suction-based operation, valve caps, and sensor caps, the invention simplifies system design while achieving precise ingredient ratios and supporting diverse configurations. It further reduces clean-in-place complexity, making it a versatile and cost-effective solution for food and beverage applications. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of an ingredient blending system for use in frozen beverage equipment or soft-serve ice cream equipment. The system comprises a manifold body having a blending chamber, a plurality of ingredient egress ports, a plurality of pressure reservoirs, and a plurality of ingredient inlet ports, each interconnected to a corresponding inlet conduit. A pump is operatively connected to an egress port of the manifold body to create suction, thereby drawing ingredients through the manifold body. At least one valve cap is disposed on an ingredient egress port, the valve cap configured to maintain the corresponding port in a permanently open state to facilitate ratiometric mixing of ingredients based on port dimensions. The blending chamber receives the ingredients from the egress ports to form a food product.

Additional shortcomings of the prior art are overcome and additional advantages are provided through the provision of an ingredient blending system for use in frozen beverage equipment or soft-serve ice cream equipment. The system provides an ingredient blending system designed for frozen beverage and soft-serve ice cream equipment. The system includes a manifold body with a blending chamber, multiple ingredient egress and ingress ports, and inlet conduits for receiving ingredients. A pump creates suction at an egress port to draw ingredients through the manifold, eliminating the need for positive pressure pumps. At least one valve cap maintains a corresponding egress port in an open state to enable ratiometric mixing based on port dimensions. The blending chamber combines the ingredients to produce a consistent food product, offering a reliable, scalable, and efficient solution for precise ingredient mixing.

Additional shortcomings of the prior art are overcome and additional advantages are provided through the provision of a method of blending ingredients for use in frozen beverage equipment or soft-serve ice cream equipment. The method provides a process for blending ingredients in frozen beverage and soft-serve ice cream equipment. Ingredients are drawn through a manifold body using suction generated by a pump connected to an egress port. The manifold body includes a blending chamber, ingredient egress and ingress ports, pressure reservoirs, and inlet conduits. At least one egress port is maintained in a permanently open state using a valve cap, enabling ratiometric mixing by adjusting the dimensions of the egress and ingress ports. The ingredients are blended within the chamber to form a food product. This method utilizes an innovative ingredient blending system with suction-based operation to streamline ingredient flow, enhance mixing precision, and accommodate diverse ingredient types, offering improved efficiency and product quality in food and beverage production.

This system and method provides precise control over ingredient mixing ratios by leveraging the configuration of egress and ingress port dimensions. The suction-based operation eliminates the need for positive pressure pumps at the inlet conduits, simplifying the system design and reducing maintenance complexity. By utilizing valve caps, the system reduces dependency on electronic components, offering a cost-effective and reliable solution for high-demand applications. Additionally, the integration of pressure reservoirs ensures consistent flow rates and allows the system to handle a variety of ingredient types, including liquids and gases. This configuration further enhances product consistency and quality, particularly in applications where precise ingredient ratios are critical to the final product's flavor, texture, and appearance.

The invention also supports dynamic configuration options, enabling the selective use of electronic valves for on-demand flow control while maintaining constant flow through valve caps. The ability to toggle between these two modes provides flexibility to adapt the system for different production requirements, ingredient properties, or operational preferences. The system's modular design allows for easy integration of additional components, such as more inlet conduits or pressure reservoirs, without requiring extensive modifications.

Cleaning and maintenance processes are significantly streamlined in this system. The suction-driven design minimizes the presence of active pumping components at the ingredient inlets, reducing the risk of blockages. Cleaning solutions can be introduced through the inlet conduits, circulating through the manifold body and blending chamber, thereby eliminating the need for disassembling individual components. This approach reduces downtime and labor costs, improving overall system efficiency.

Scalability is another key feature of the invention. The manifold body can be expanded to accommodate additional egress ports, ingress ports, or blending chambers, making the system suitable for a wide range of production scales. This scalability ensures the system's applicability in both small-scale operations, such as artisan food production, and high-volume commercial environments, such as frozen beverage or ice cream manufacturing facilities.

Moreover, the system's design supports the use of a wide range of ingredient types, including liquids with varying viscosities, gases, and combinations thereof. The ability to mix these diverse ingredients with precision enables the production of complex food products with enhanced sensory attributes, such as aerated frozen desserts or beverages with layered textures.

The use of durable, food-safe materials such as stainless steel or high-grade polymers in the construction of the manifold body, valve caps, and sensor caps ensures compliance with stringent food safety standards. The modular components are designed for easy replacement, minimizing downtime during maintenance and extending the overall lifespan of the system.

By addressing the limitations of prior art, the present invention offers a robust and versatile solution for ingredient blending in the food and beverage industry. The system's innovative design enhances operational efficiency, reduces complexity, and improves product quality, making it an ideal choice for a variety of applications, including frozen beverages, soft-serve ice cream, and other food products requiring precise ingredient mixing.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 14 illustrates one example of a method of blending ingredients for use in frozen beverage equipment or soft-serve ice cream equipment; and FIG. 15 illustrates exemplary embodiments that can interchangeably be used with the methods of the present invention.

Figure 1:
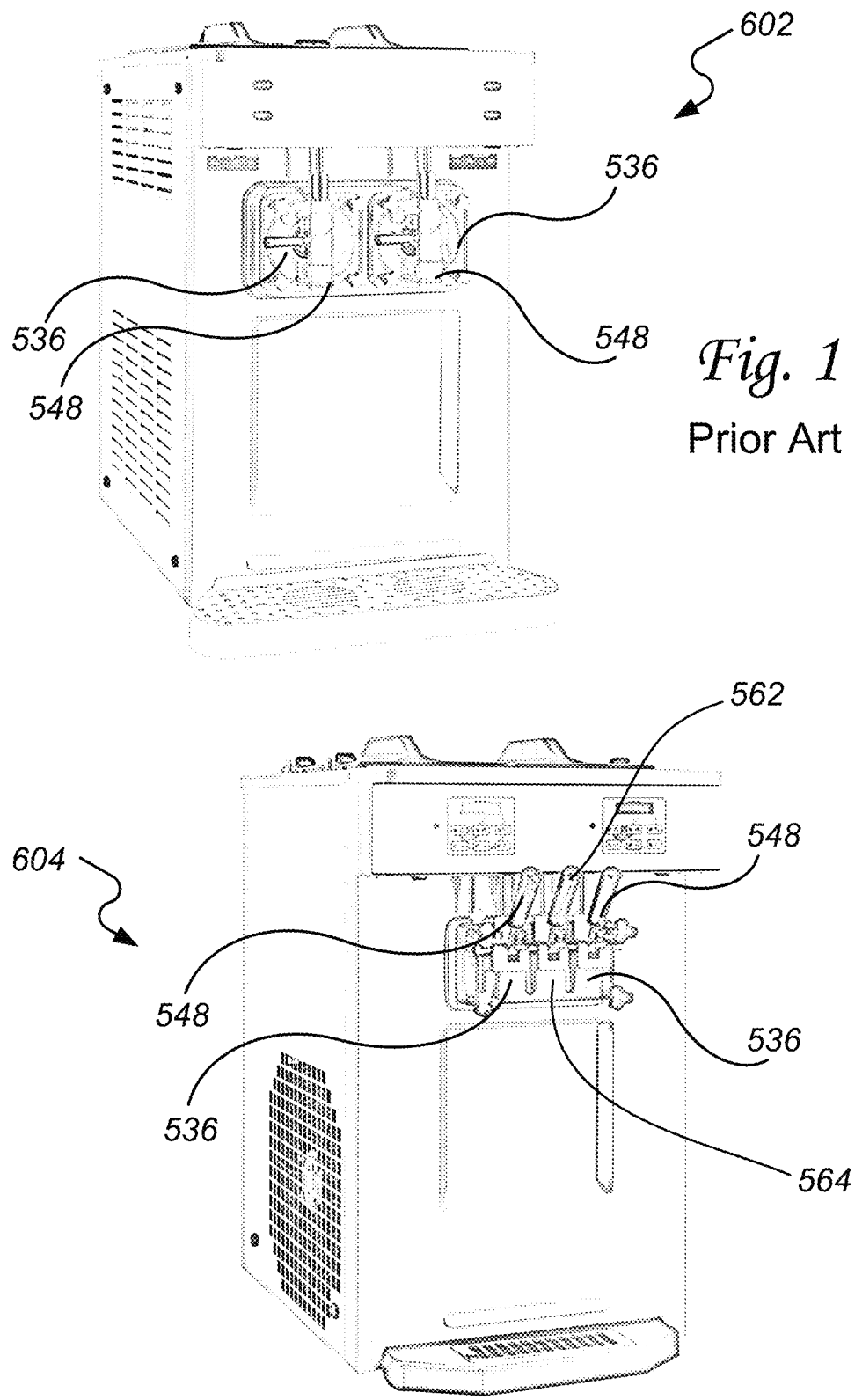
FIG. 1 illustrates examples of frozen beverage equipment and soft-serve ice cream equipment.

The detailed description explains the preferred embodiments of the invention, together with advantages and features, by way of example with reference to the drawings.

DETAILED DESCRIPTION OF THE INVENTION

The present invention uses nomenclature to indicate multiple mutually exclusive operating channels in the ingredient blending manifold 100. In a plurality of exemplary embodiments, there can be any number of electronic valves 110/112 and bending channels used with the ingredient blending manifold 100. As one exemplary embodiment, the Figures illustrate as an example and not a limitation three electronic valves 110A-C/112A-C. Each electronic valve 110A/112A, 110B/112B, and 110C/112C is mutually exclusive and independently operable. The electronic valve 110/112 nomenclature indicates that there is a valve base 110 which physically controls the flow of an ingredient through the valve base and a valve actuator 112 that 'OPENS' and 'CLOSES' the valve. The combination 110/112 forms the electronic valve that can be operated by way of a valve controller 512 under the control of microcontroller 502.

The present invention uses nomenclature to indicate multiple ingredients 202/204/206 and 210/212/214. Ingredient 202 on the supply side of the pump/metering device and ingredient 210 on the pumped/metered supply line side of the pump are the same. Ingredient 204 on the supply side of the pump/metering device and ingredient 212 on the pumped/metered supply line side of the pump are the same. Ingredient 206 on the supply side of the pump/metering device and ingredient 214 on the pumped/metered supply line side of the pump are the same.

The present invention uses nomenclature to indicate other multiple mutually exclusive operating components and channels associated with the ingredient blending manifold 100. In a plurality of exemplary embodiments, there can be any number of pressure sensors 106, pressure reservoirs 126, ingredient egress port 120, ingredient ingress port 122, mounting hole 114, and other components and features of the ingredient blending manifold 100, as may be required and/or desired in a particular embodiment.

For disclosure purposes, ingredients that can be mixed to form the food product 208 can include a combination of gas portion 202, food portion 204, or water portion 206. There can be more than one gas portion 202, or more than one food portion 204, as may be required and/or desired in a particular embodiment.

Turning now to the drawings in greater detail, it will be seen that in FIG. 1 there are illustrated examples of frozen beverage equipment and soft-serve ice cream equipment. Frozen beverage equipment 602 and soft-serve ice cream equipment 604 are commonly found in restaurants, quick-serve restaurants, convenience stores, and numerous other locations.

In an exemplary embodiment, each frozen beverage equipment 602 and soft-serve ice cream equipment 604 can comprise one or more separate mixing cylinders 536 that contain a food product 208. An ingredient blending manifold 100 receives a food portion 212 from a food portion supply 204 and a gas portion 210 that is either an air supply or a gas portion supply 202 that are combined to form the food product 208 which can be injected through a product inlet 544 into the mixing cylinder 536, chilled and dispensed by way of a dispense valve 548 by a user 302 or customer 304 for consumption. Selectively, in some exemplary embodiment, a water portion 214 from a water portion supply 206 can also be supplied. For disclosure purposes, the air supply and the gas portion supply, such as nitrogen, carbon dioxide, and other gases can both be referred to as the gas portion supply 202.

In an exemplary embodiment, when the frozen beverage equipment 602 or soft-serve ice cream equipment 604 is not in use to serve frozen beverages or soft-serve ice cream, a clean-in-place (CIP) function can be performed by providing a cleaning solution with or without additional water that is pumped through the ingredient blending manifold 100 and associated interconnected tubing or piping, as may be required and/or desired in a particular embodiment.

Each of the food portion 212, gas portion 210, and selectively water portion 214 are ratiometrically blended in the ingredient blending manifold 100 and then injected into the mixing cylinder 536 so that the percentage proportion of each ingredient portion to the other is maintained. The food product 208 is chilled in the mixing cylinder 536 and dispensed through a dispense valve 548. Such food product 208 dispensing can be automated and portion-controlled or effectuated by a user 302 or customer 304 manually.

The term "ratiometrically" or "ratiometric", in the present invention, is intended to mean two or more ingredients, portions, or other contents being mixed in a continuous predefined ratio regardless of the total volume being mixed forming a ratiometric mixture, such as food product 208. Such portions can be the food portion 212, the gas portion 210, water 214, or other portions. Each ingredient, portion, or other content is mixed in a predefined ratio with respect to each of the other ingredients, portions, or other contents, as may be required and/or desired in a particular embodiment. In this regard, any volume of the final food product 208 mixture comprising the ingredients, portions, or other contents can be produced. Such gas portions can be air, carbon dioxide, nitrogen, or other gas portion.

The frozen beverage equipment 602 and soft-serve ice cream equipment 604 can be configured with any number of mixing cylinders 536 comprising the same or different kinds of food portions 212, gas portions 214, and thus food products 208. Illustrated in FIG. 1, as an example and not a limitation, frozen beverage equipment 602 is shown with two separate mixing cylinders 536 and dispense valves 548. Soft-serve ice cream equipment 604 is shown with two separate mixing cylinders 536 and dispense valves 548, and one additional dispense valve 562 that combines food products from both mixing cylinders 536 into a single dispense stream 564. This configuration is common where one mixing cylinder comprises, as an example, chocolate ice cream, the other mixing cylinder comprises, as an example, vanilla ice cream, and the additional dispense valve 562 dispenses 564 a mixture of chocolate and vanilla ice cream.

In operation, the food product 208 is blended in the ingredient blending manifold 100 as a food portion 212, a gas portion 210, and selectively a water portion 214 and then injected through a product inlet 544 into mixing cylinder 536 and chilled to a predetermined frozen malleable consistency. A user 302 or customer 304 can then dispense the food product 208 by way of a dispense valve 548. The gas portion 210 can be air, carbon dioxide, nitrogen, or other types and kinds of gases, as may be required and/or desired in a particular embodiment. In an exemplary embodiment, gases such as carbon dioxide, and other gasses can be injected into the ingredient blending manifold 100 and thus the mixing cylinder 536 at a sufficient pressure to cause the gas to dissolve into the food portion 212 resulting in the food product 208 becoming carbonate in the case of dissolved carbon dioxide gas, or otherwise imbibed, or infused with the gas.

Figure 2A:
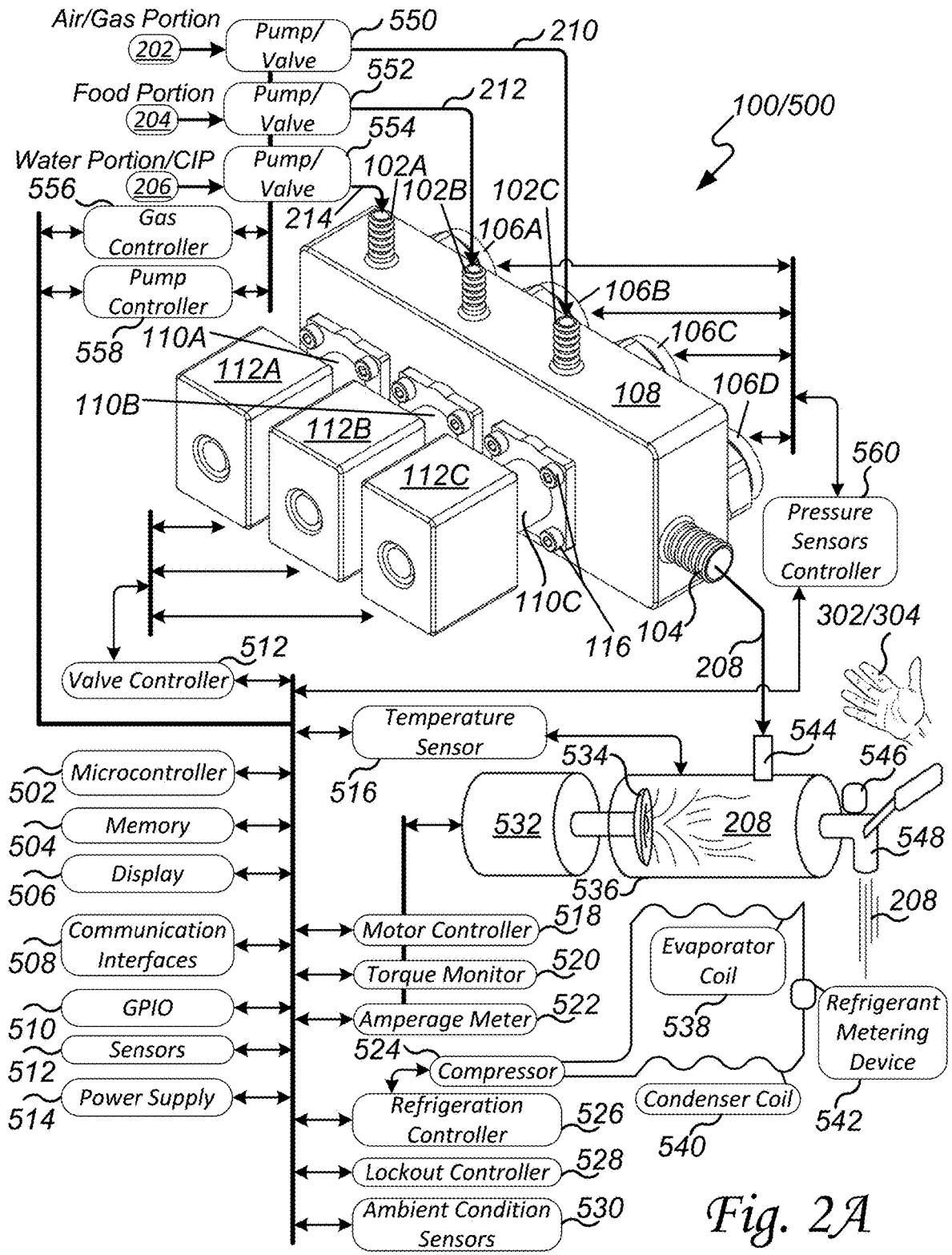
FIG. 2A illustrates one example of an ingredient blending system.

Referring to FIG. 2A, there is illustrated one example of an ingredient blending system 100/500. The ingredient blending system comprises an ingredient blending manifold 100, and a control system 500 is interconnected with other components including at least one mixing cylinder 536 with food product 208 dispensing capabilities.

In an exemplary embodiment, the ingredient blending manifold 100 comprises a manifold body 108, more than one of an inlet conduit 102A-C through which ingredients such as an air/gas portion 210 from an air/gas supply 202, a food portion 212 from a food portion supply 204, and a water portion 206 from a water portion supply 206 enter the manifold body 108 through inlet conduits 102A-C. The ingredient blending manifold 100 further comprises more than one pressure sensor 106A-D. The pressure sensors 106A-D are configured to measure the pressure of each ingredient 210/212/214 that enters through the inlet conduits 102A-C, and the blended food product 208 that exits the manifold body 108 blending chamber 128 through the food product egress conduit 104.

The ingredient blending manifold 100 further comprises more than one electronic valve 110A-C/112A-C. The electronic valves 110A-C/112A-C are secured to the front side of the manifold body 108 such that when one or more of an electronic valve 110A-C/112A-C is in the 'OPEN' position the respective ingredient 210/212/214 passes into the blending chamber 128, which is internal to the manifold body 108, where it is blended with other ingredients 210/212/214 to form the food product 208. In the alternative, when an electronic valve 110A-C/112A-C is in the 'CLOSED' position the respective ingredient 210/212/214 is prevented from entering the blending chamber 128. The blending chamber 128 is better illustrated in at least FIG. 9.

In an exemplary embodiment, the electronic valve 110A-C/112A-C can comprise a valve body 110A-C that is fastened to the manifold body 108 by fasteners 116 and an actuator 112A-C which when energized transitions a valve within the valve body 110 between an 'OPEN' and a 'CLOSED' position. The 'OPEN' position allows ingredients 202/204/206 to enter the blending chamber 128 and the 'CLOSED' position abates the flow of ingredients 202/204/206 from entering the blending chamber 128. In operation, one electronic valve 110A/112A, 110B/112B, or 110C/112C controls the flow of one ingredient 202, 204, or 206, thus multiple electronic valves are required to be able to control multiple ingredient supply lines.

In an exemplary embodiment, control system 500 can be integrated into and control frozen beverage equipment 602 and soft-serve ice cream equipment 604. In addition, control system 500 can be a web-enabled control system.

The term "web-enabled" or "web-enabled control system" or "web-enabled control system 500" in the present invention is intended to mean an Internet-of-Things (IoT) device. In this regard, a device that is capable of connecting a physical device such as the frozen beverage equipment 602 and soft-serve ice cream equipment 604 to the digital world. Stated differently, web-enabling is equipping a device with the necessary electronics and software to be monitored, controlled, and data communicate locally and remotely with other data communicating devices. Such other data communicating devices can be smartphones, tablets, laptops, mobile communication devices, other web-enabled devices, servers, and similar devices.

In addition, such data communicating devices 706 can data communicate with remote data processing resources 704 and utilize data storage resources 702. Laptops, smartphones, smartwatches, tablets, desktop computers, servers, mobile communication devices, and other types and kinds of data communication devices can all be referred to as data communicating devices 706.

In operation, a user 302, or a customer 304 can use data communicating devices 706 to interact with the frozen beverage equipment 602 and soft-serve ice cream equipment 604. In this regard, a user 302 can be a person who operates, maintains, cleans, configures, repairs, and performs other functions on or with the frozen beverage equipment 602 or soft-serve ice cream equipment 604. A customer 304 can be a person who self-serve dispenses food product 208. The digital experience and interaction with the frozen beverage equipment 602 and soft-serve ice cream equipment 604 by the user 302, and customer 304 can be different and suited for their various roles and requirements, as may be required and/or desired in a particular embodiment.

Such data processing resources 704 can be a server or other types and kinds of data processing resources. Furthermore, data communicating devices 706, remote data processing resources 704, data storage resources 702, and other types and kinds of data communicating devices can data communicate over a global network 700. The Internet is a global network 700.

In an exemplary embodiment, the frozen beverage equipment 602 and soft-serve ice cream equipment 604 can be equipped with a web-enabled control system 500. Such a web-enabled control system can comprise a microcontroller 502 which is operationally related to a valve controller 512, a plurality of communication interfaces 508, a power supply 514, a gas controller 556, a pump controller 558, a display 506, general-purpose inputs and outputs (GPIO) 510, sensors 512, motor controller 518, a memory 504, a torque monitor 520, an amperage meter 522, a refrigeration controller 526, a temperature sensor 516, ambient sensors 530, and a lockout controller 528.

The microcontroller 502 can be INTEL, ZILOG, MICROCHIP, AMD, ARM, and/or other types or kinds of microcontrollers.

The memory 504 can be a combination of RAM, ROM, flash, hard drives, solid-state drives, USB flash drives, and/or other types and kinds of memory.

The display 506 can be an LCD, OLED, LED, as well as have touch input capabilities and/or other types and kinds of displays and user inputs as may be required and/or desired in a particular embodiment.

The communication interface 508 can be LAN, WAN, USB, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

In an exemplary embodiment, the communication interface 508 is operationally related to the microcontroller 502. The control system by way of the communication interface 508 data communicates with the remote data processing resource 704, data communication devices 706, remote service provider 306 networks, quick-server restaurant networks, other frozen beverage equipment 602 and soft-serve ice cream equipment 604, in a local area network environment or a wide area network environment across a global network 700 in a wired or wireless manner as may be required and or desired in a particular embodiment. The Internet is a global network 700.

The power supply 514 can be AC, DC, battery, solar, and/or other types and kinds of power supplies.

The pump controller 558 can be a relay, MOSFET, or other types and kinds of controlling devices. In operation, the pump controller 558 interconnects with and is operationally related to one or more pumps 552/554 that transfer the food portion supply 204/212 and the water or clean-in-place (CIP) solution supply 206/214 to the ingredient blending manifold 100. In an exemplary embodiment, the food portion 204 pump/valve 552 and the water portion 206 water pump/valve 554 can include pressure regulating valves limiting the inlet pressure to a desired and fixed pressure and flow rate from their respective food portion 204 and water portion 206 sources. As such, the pump/valve 552/554 can pump to create flow and/or regulate the pressure to induce the desired and predictable flow rate. The pump/valve 552/554 can be 'OPENED' turned 'ON' and/or 'CLOSED' turned 'OFF' to control the food portion 204 and water portion 206 flows. In addition, pump/valve 552/554 can also comprise one-way valves to limit water and/or food portion flow to a single direction and prevent backfilling.

The gas controller 556 can be a relay, MOSFET, metering device, or other types and kinds of controlling devices. In operation, the gas controller 556 interconnects with and is operationally related to one or more gas metering devices or pumps 550 that transfer air or gas 202/210 to the ingredient blending manifold 100. Such gas portions can be air, carbon dioxide, nitrogen, or other gas portion.

The valve controller 512 can be a relay, MOSFET, or other types and kinds of controlling devices. In operation, the valve controller 512 interconnects with and is operationally related to one or more electronic actuators 112A-C that 'OPEN' and 'CLOSE' the valve bodies 110A-C allowing ingredients to be transferred into the blending chamber 128. Such electronic actuators can be solenoids or other types and kinds of actuators, as may be required and/or desired in a particular embodiment.

The motor controller 518 can be a relay, MOSFET, variable frequency drive controller (VFD), or other types and kinds of motor control devices.

The torque monitor 520 can be a communication interface that communicates with a motor controller such as a VFD motor controller or other motor controllers that provides information about the motor performance that can include a torque metric determination or other motor performance data such that the control system 500 can calculate the torque of the auger motor 532 resultant from the torque on the auger 534 turning through the food product 208. In an exemplary embodiment, analog-type sensor determinations can be converted to digital values so that the microcontroller 502 can process the data. Alternatively, the microcontroller 502 can perform analog-to-digital conversions if equipped to perform such functions.

In another exemplary embodiment, torque can be measured mechanically by having a force of the food product 208 mixed in the mixing cylinder 536 applied to a lever that increasingly displaces as the food product 208 transitions to a predetermined frozen malleable consistency. The amount of displacement of the lever can be measured by the torque monitor 520 automatically electronically to determine a relative torque reading that can then be used in the methods of the present invention.

The amperage meter 530 can be a current transformer such as a torrid coil winding having one of the auger motor electrical wires running through the center of the torrid coil, or other types and kinds of electrical current sensing techniques and/or devices. In an exemplary embodiment, analog-type sensor determinations can be converted to digital values so that the microcontroller 502 can process the data. Alternatively, the microcontroller 502 can perform analog-to-digital conversions if equipped to perform such functions.

A refrigeration system comprises the refrigeration controller 526. The refrigeration controller 526 can be a relay, MOSFET, or other types and kinds of refrigeration controlling devices. The refrigeration system further comprises a compressor 524 that is interconnected with and operationally related to the refrigeration controller 526. The compressor 524 circulates the refrigerant through a condenser coil 540, a refrigerant metering device 542 such as an expansion valve, and an evaporate coil 538. In operation, the refrigeration system chills the food product 208 in the mixing cylinder 536 to a predetermined frozen malleable consistency. The refrigeration system can use a variety of refrigerant types including for example thermoelectric such as Peltier and others, vapor-compression, non-vapor-compression, and other types and kinds of refrigeration system, as may be required and/or desired in a particular embodiment.

The temperature sensor 516 can be positioned and configured to measure the temperature of the food product 208 within the mixing cylinder 536. Such a temperature sensor 516 can be a resistive temperature (RTD), thermistor, infrared, integrated silicon-based, or other types and kinds of temperature sensors as may be required and/or desired in a particular embodiment. In an exemplary embodiment, analog-type sensor determinations can be converted to digital values so that the microcontroller 502 can process the data. Alternatively, the microcontroller 502 can perform analog-to-digital conversions if equipped to perform such functions.

In an exemplary embodiment, a user interface comprises at least one of the following a display 506, a display 506 with touchscreen, a communication interface 508 configured to data communicate with a digital computing device 706, a plurality of button input capabilities by way of the GPIO 510, or other user interfaces. The user interface is operationally related to the microcontroller 502 such that a user 302 or customer 304 can enter the portion-controlled dispense amount volume by way of the user interface.

The pressure sensor control is interconnected with and operationally related to a plurality of pressure sensors 106A-D. In an exemplary embodiment, a pressure sensor 106A-D can be diagram displacement-based, strain gauge, variable capacitance, resistive, piezoelectric, micro-electrical mechanical system (MEMS), and/or other types and kinds of pressure sensors, as may be required and/or desired in a particular embodiment. In an exemplary embodiment, analog-type sensor determinations can be converted to digital values so that the microcontroller 502 can process the data. Alternatively, the microcontroller 502 can perform the analog-to-digital conversions if equipped to perform such functions.

The GPIO 510 can be TTL, CMOS, transistors, buffers, relays, pushbutton, switch, and/or other types and kinds of GPIO circuits.

The sensors 512 can be PIR motion sensors, infrared, thermal, Doppler radar, ultrasonic, capacitance, touch-type, optical, Hall effect, switch, fingerprint, and other types of biometric sensors, and/or other types and kinds of sensors. In an exemplary embodiment, analog-type sensor determinations can be converted to digital values so that the microcontroller 502 can process the data. Alternatively, the microcontroller 502 can perform analog-to-digital conversions if equipped to perform such functions.

The ambient condition sensors 530 can be temperature, moisture, humidity, sunlight, time, date, and/or other types and kinds of sensors. In an exemplary embodiment, analog-type sensor determinations can be converted to digital values so that the microcontroller 502 can process the data. Alternatively, the microcontroller 502 can perform analog-to-digital conversions if equipped to perform such functions.

A lockout controller 528 can be a relay, MOSFET, solenoid, or other types and kinds of lockout controlling devices. In operations, a dispense lock 546 is operationally related to a lockout controller 528. The dispense lock 546 can be a solenoid or other types or kinds of dispense locks, as may be required and/or desired in a particular embodiment. The dispense lock 546 can operate in at least two distinct configurations. First, the dispense lock 546 can unlock the dispense valve 548 for normal operation, allowing a user 302 or a customer 304 to dispense the food product 208 when the temperature and/or the viscosity of the food product 208 is optimum, and as required other parameters indicate the food product 208 is ready to be served. In the alternative, the lockout controller 528 can lock the dispense valve 548 preventing food product 208 dispense when the food product 208 is not ready to be served. The second manner of operation can be enabling an automated dispense valve 548. In this configuration, the dispense lock 546 can be coupled to a dispense valve 548 where activation causes the dispense valve 548 to 'OPEN' allowing the food product 208 to egress the mixing chamber 536. In the alternative when the dispense lock 546 is deactivated the dispense valve 548 is 'CLOSED' such that the food product 208 is prevented from egressing the dispense valve 548. Such automated food product 208 dispense control is useful in quick-serve restaurant applications, portion control applications, and other applications.

Figure 2B:
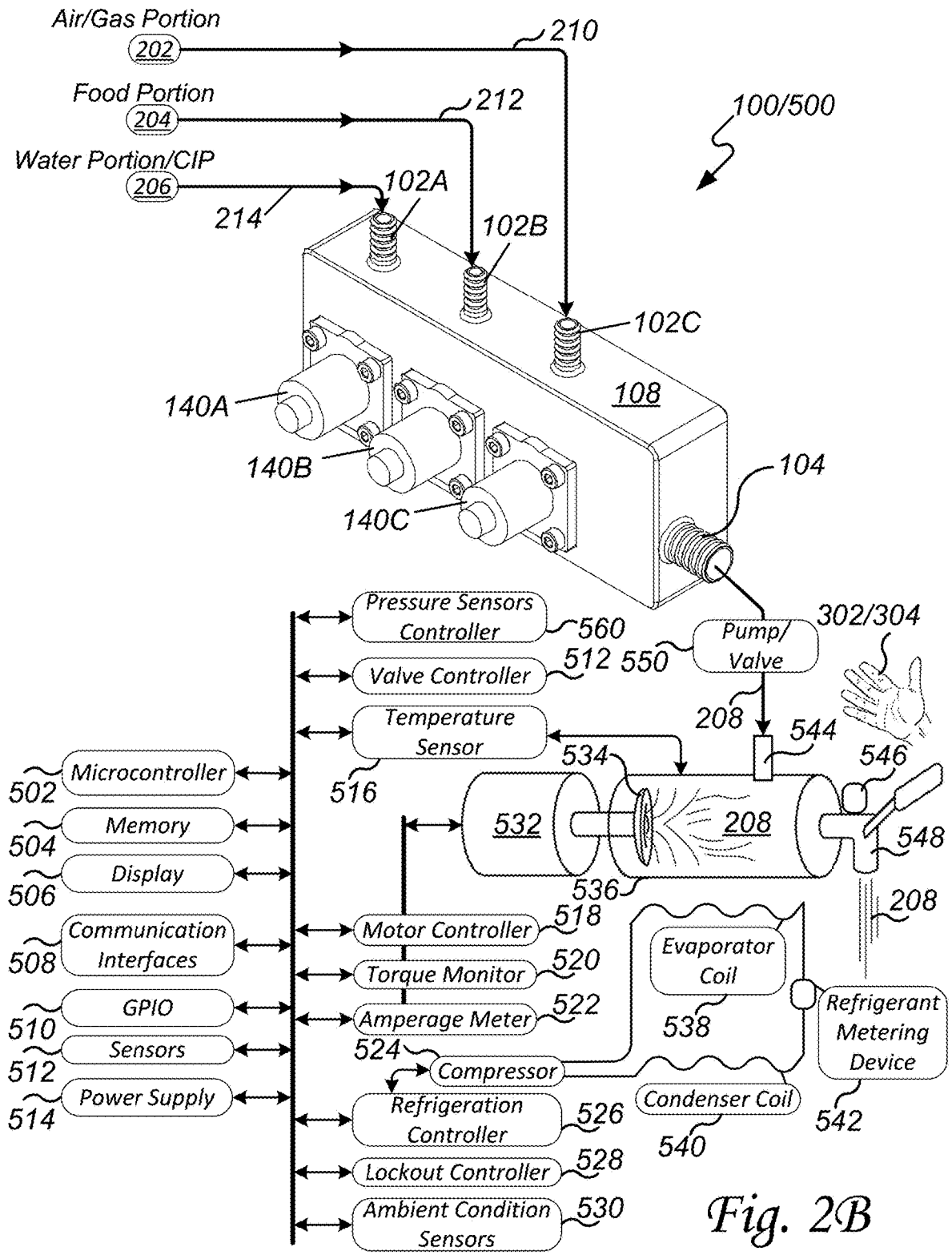
FIG. 2B illustrates one example of an ingredient blending system configured for egress port pump applications.

Referring to FIG. 2B, there is illustrated one example of an ingredient blending system configured for egress port pump applications. In this exemplary embodiment, the system incorporates a manifold body 108 that facilitates blending multiple ingredients 202/204/206 through suction created by a pump 550 connected to an egress port 104. This configuration eliminates the need for positive pressure pumps at the ingredient inlet conduits 102A-C, simplifying the overall system architecture and enhancing reliability.

The manifold body 108 includes a blending chamber 128 where ingredients are mixed to form a food product 208. A plurality of ingredient inlet ports 130/132/134 can be positioned to receive ingredients such as food portions 204, gas portions 202, and water portions 206 through corresponding inlet conduits 102A-C. The ingredient inlet ports are connected to pressure reservoirs 126A-C, which temporarily store the ingredients before they are directed into the blending chamber 128. The blending chamber 128 is also in fluid communication with a plurality of ingredient egress ports 120A-C and corresponding ingredient ingress ports 122A-C.

In this embodiment, at least one ingredient egress port 120A-C is fitted with a valve cap 140. The valve cap 140 is a non-electronic component that maintains the corresponding egress port in a permanently open position, allowing continuous fluid communication between the corresponding ingredient egress port 120 and ingredient ingress port 122. By configuring the diameters of the ingredient egress ports 120A-C and ingress ports 122A-C, the system achieves ratiometric mixing of ingredients, ensuring precise proportions are maintained within the blending chamber 128. For instance, the diameter of an ingredient egress port 120C associated with a food portion 204 may be smaller than that of a water portion 206 to regulate the mixing ratio effectively.

The pump 550, connected to the egress port 104, creates negative pressure within the manifold body 108, effectively drawing ingredients 202/204/206 from the inlet conduits 102A-C through the pressure reservoirs 126A-C and into the blending chamber 128. This suction-based operation reduces system complexity by eliminating the need for individual pumps or positive pressure mechanisms at each ingredient supply line. Additionally, the system supports dynamic ingredient flow control by selectively combining valve caps 140 and electronic valves 110A-C/112A-C. For example, certain egress ports 120A-C may be equipped with electronic valves 110A-C/112A-C to enable on-demand flow control, while others utilize valve caps 140 for continuous operation.

In an exemplary embodiment, the pressure sensors 106A-D integrated into the pressure reservoirs 126A-C to monitor ingredient pressures can be used with the valve caps 140A-C or all or some of the pressure sensors 106A-D can be replaced with sensor caps 142A-D to further simplify the system and reduce electronic component reliance. When pressure sensors 106A-D are used, they provide critical data for controlling ingredient flow and ensuring consistent blending. In the absence of electronic monitoring, sensor caps 142A-D maintain the integrity of the pressure reservoirs 126A-C, allowing fluids to accumulate and flow as required.

In one embodiment, the blending chamber 128 is designed to mix ingredients 202/204/206 in predefined ratiometric proportions. The diameters of the ingredient egress ports 120A-C and ingress ports 122A-C can be configured to control these ratios, allowing precise control over the composition of the blended food product 208. The manifold body 108 can support multiple configurations, enabling customization for various ingredient types and applications. For example, a gas portion 202 can be introduced alongside liquid ingredients 204/206 to achieve specific texture or carbonation effects in the food product 208.

In another embodiment, the system allows selective use of electronic valves 110A-C/112A-C and valve caps 140. For applications requiring frequent changes in ingredient flow, electronic valves 110A-C/112A-C may be employed to provide precise control. Conversely, valve caps 140 can be used for ingredients with a constant flow requirement, reducing system complexity and maintenance needs.

The system also supports a variety of ingredient supply configurations. A single ingredient 202/204/206 may be routed through multiple inlet conduits 102A-C to achieve higher flow rates or blended using different proportions in separate chambers. This flexibility makes the system adaptable to diverse food and beverage production environments.

For enhanced usability, the system can include a control interface 500 that integrates with the pressure sensors 106A-D and electronic valves 110A-C/112A-C. This interface allows operators to monitor and adjust ingredient flows in real-time, ensuring consistent product quality. In embodiments using sensor caps 142A-D, the control interface 500 can still provide basic operational monitoring and error detection.

The pump-driven suction mechanism offers significant advantages for maintenance and cleaning. A cleaning solution can be introduced through the inlet conduits 102A-C, circulating through the manifold body 108 and blending chamber 128 to ensure thorough sanitation. The absence of active pumping components at the inlet conduits minimizes the risk of blockages and simplifies the cleaning process.

In yet another embodiment, the system is designed for scalability. Additional inlet conduits 102A-C, egress ports 120A-C, or blending chambers 128 can be integrated into the manifold body 108 to accommodate a broader range of ingredients 202/204/206 or higher production volumes. Each additional component can be equipped with a valve cap 140 or an electronic valve 110A-C/112A-C, sensor cap 142, or pressure sensors 106, depending on the specific application requirements.

The manifold body 108, valve caps 140A-C, sensor caps 142A-D can be constructed from durable, food-safe materials such as stainless steel or high-grade polymers. This ensures compliance with food safety standards and enhances the system's durability in high-demand environments. The components, including valve caps 140A-C and sensor caps 142A-D, can be designed for easy replacement, reducing downtime during maintenance.

This embodiment of the ingredient blending system offers a robust, versatile solution for applications in frozen beverage equipment and soft-serve ice cream equipment. By combining valve caps 140, sensor caps 142, suction-based operation via pump 550, and flexible configurations, the system addresses key challenges in ingredient mixing, such as maintaining precise ratios, reducing component complexity, and supporting diverse ingredient types. The use of valve caps 140 and sensor caps 142A-D ensures operational efficiency while minimizing electronic dependencies, making the system suitable for high-demand commercial environments.

Figure 3:
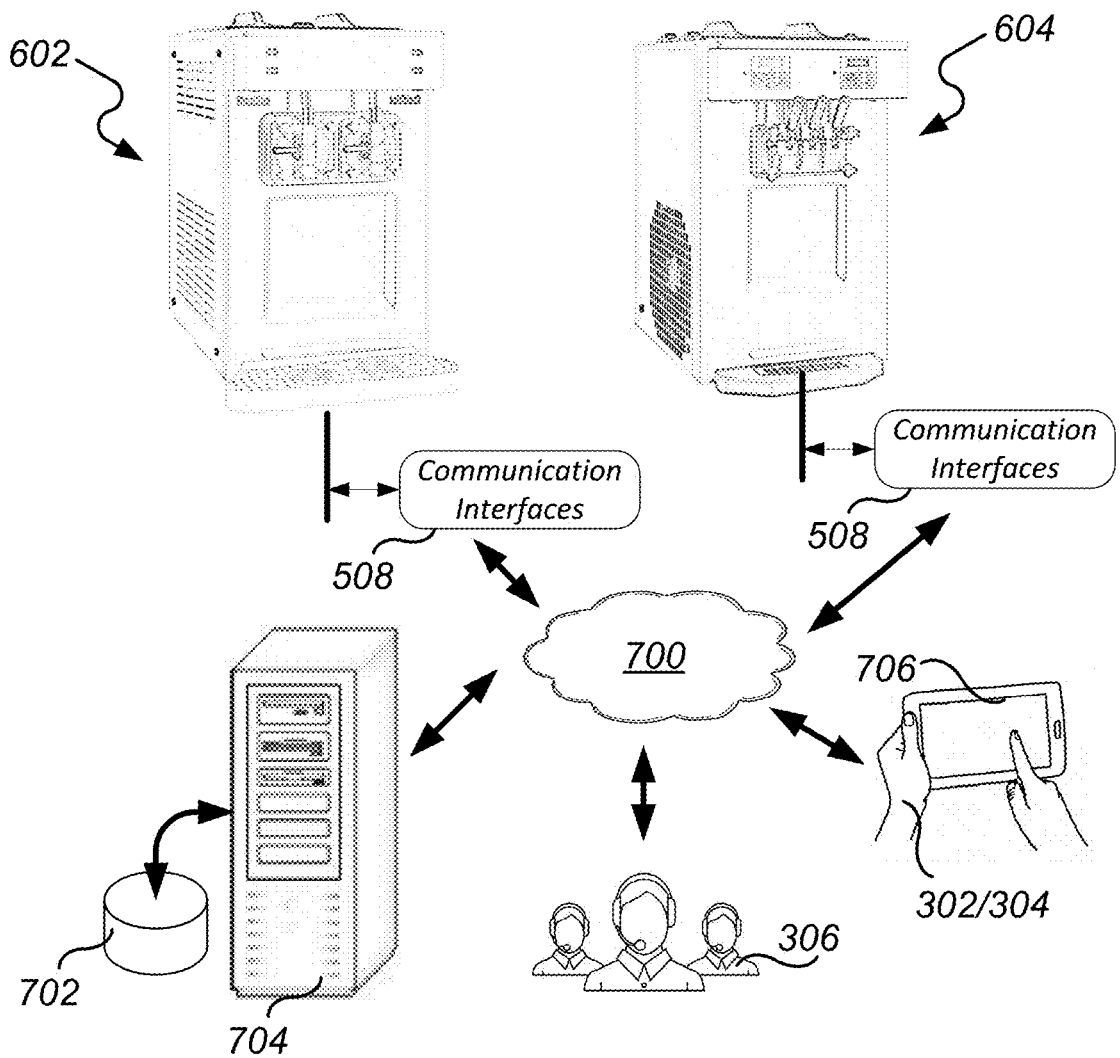
FIG. 3 illustrates one example of a global network-based system block diagram.

Referring to FIG. 3, there is illustrated one example of a global network-based system block diagram. In an exemplary embodiment, by way of control system 500 communication interface 508, frozen beverage equipment 602 and soft-serve ice cream equipment 604 can data communicate over a global network 700 with one or more remote data processing resources 704, databases 702 that are operationally related to a remote data processing resource 704, one or more data communication device 706 operated by user 302 or customer 304, and one or more remote service provider 306. The Internet is one example of a global network 700. Database 702 is operationally related to the remote data processing resource 604. In addition, there can be any number of remote data processing resources 704, and/or database 702, as well as other global network-based computing devices, as may be required and/or desired in a particular embodiment.

Such data communication devices 706 can include smartphones, tablets, laptops, other web-enabled devices, mobile communication devices, and other data communication devices, as may be required and/or desired in a particular embodiment.

Such remote data processing resource 704 can be a server, network appliance, or other types and kinds of remote data processing resources, as may be required and or desired in a particular embodiment.

Such remote service provider 306 can be a technical service network, a call center, a customer service organization, an alarm/equipment service monitoring company, or other types and kinds of remote service providers.

Figure 4:
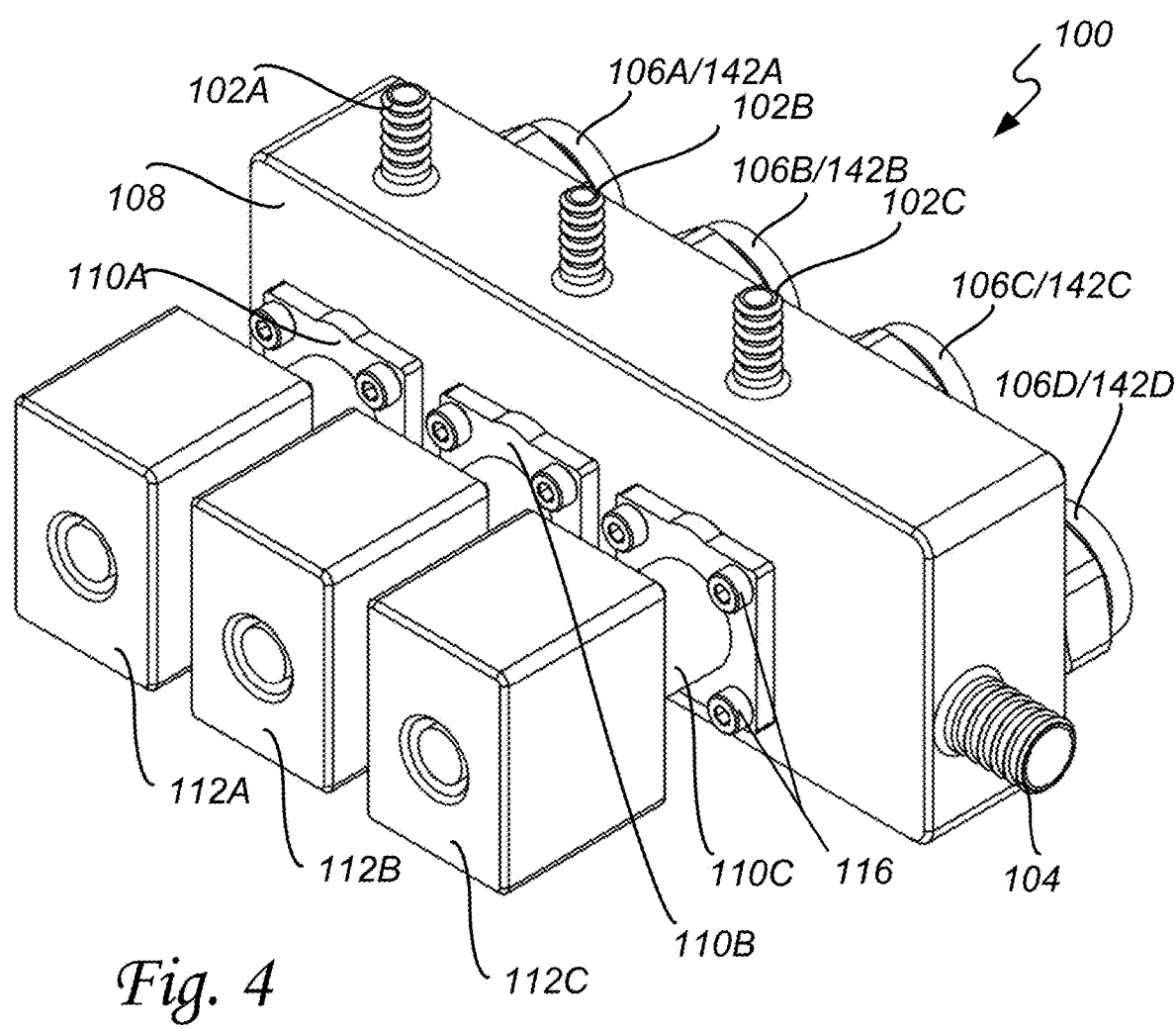
FIGS. 4-6 illustrate examples of an ingredient blending manifold.

Referring to FIG. 4, there is illustrated one example of a top front perspective view of an ingredient blending manifold 100. In an exemplary embodiment, the electronic valves 110A-C/112A-C are fastened by way of fasteners 116 to the front side of the manifold body 108.

Figure 5:
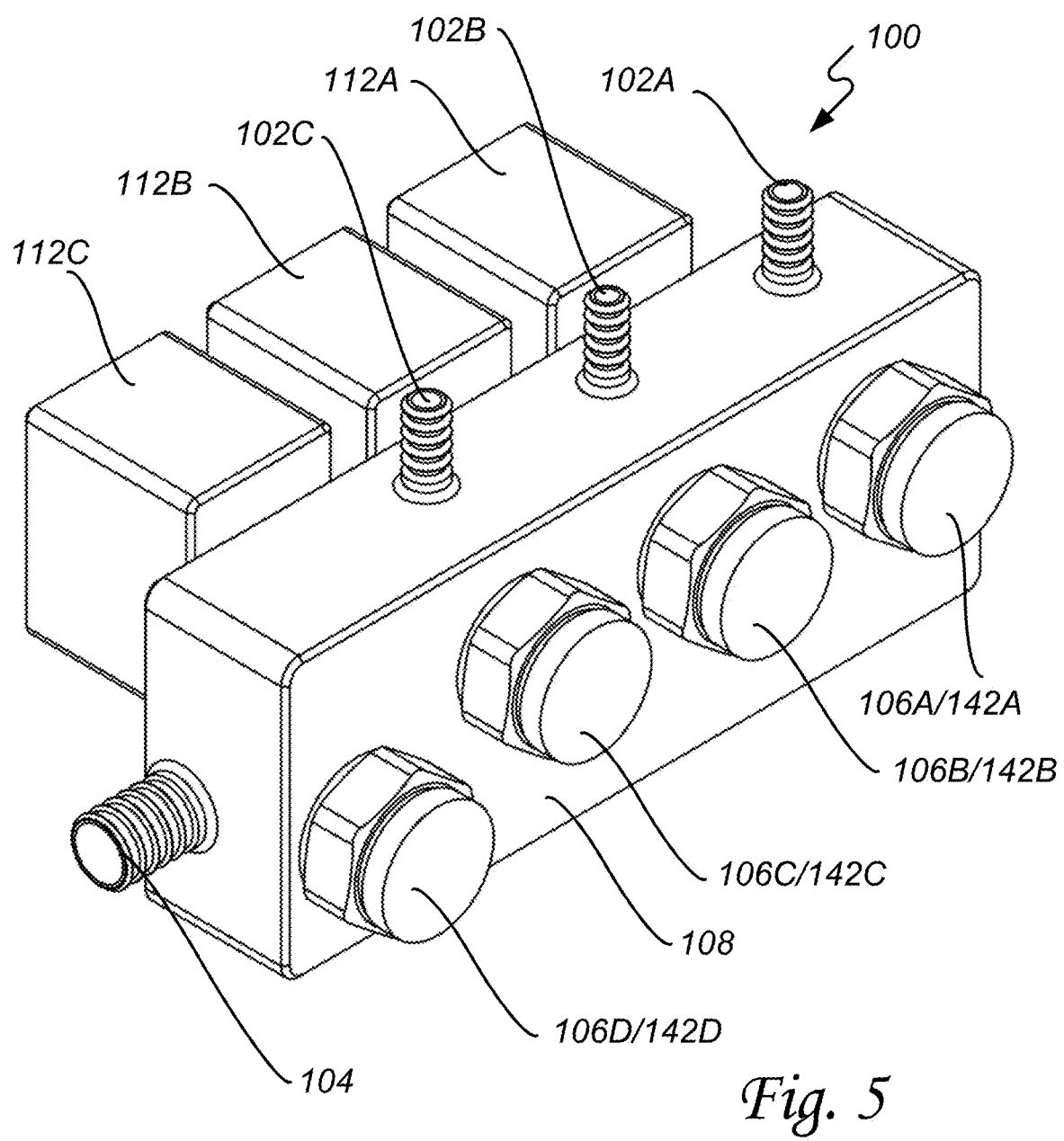

Referring to FIG. 5, there is illustrated one example of a top backside perspective view of an ingredient blending manifold 100. In an exemplary embodiment, pressure sensors 106A-D are secured within each of the pressure reservoirs 126A-D. The pressure reservoirs 126A-D are better illustrated in at least FIG. 8.

Figure 6:
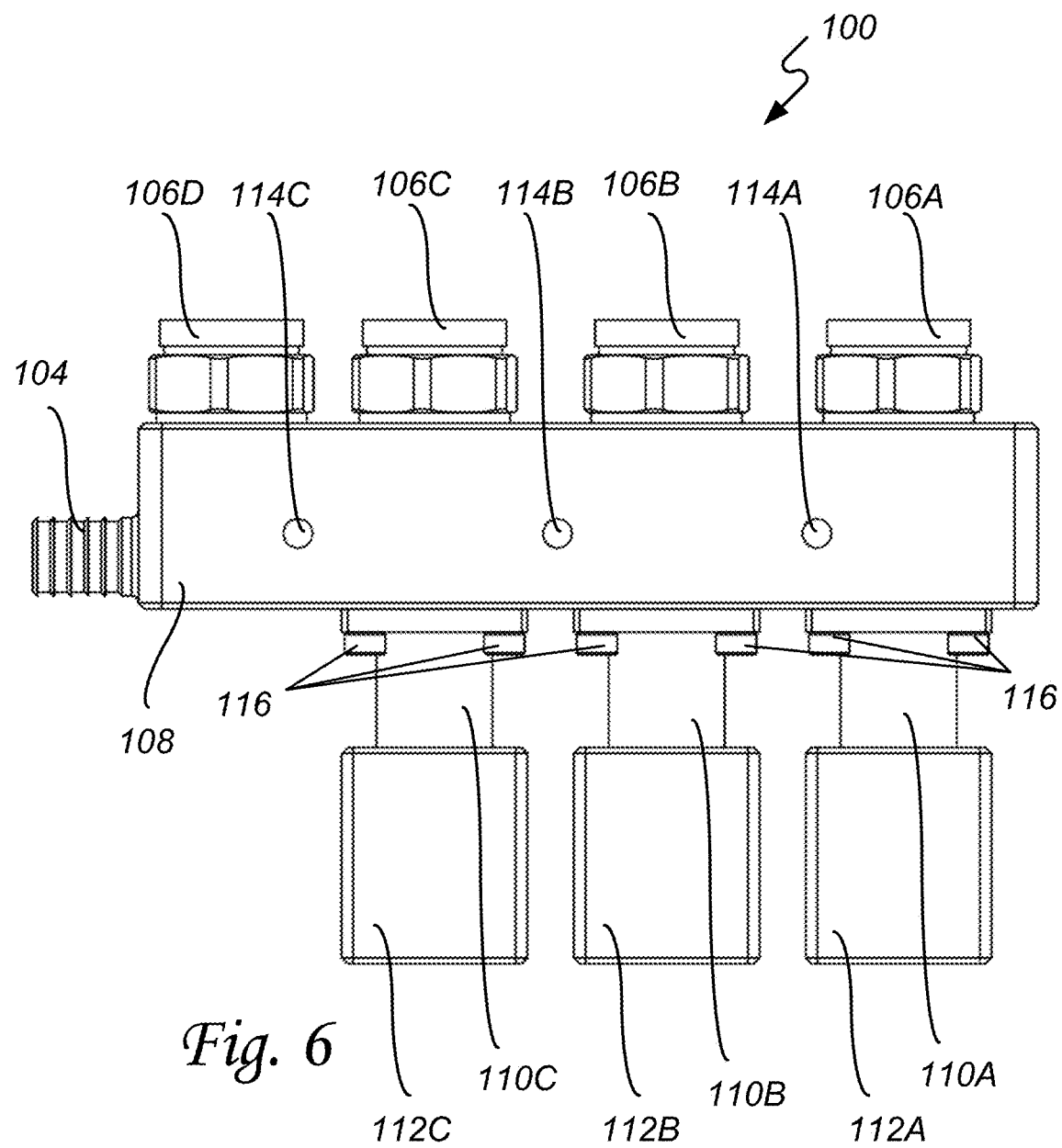

Referring to FIG. 6, there is illustrated one example of a bottom side view of an ingredient blending manifold 100. In an exemplary embodiment, the manifold body 108 can have one or more mounting holes 114A-C for receiving a fastener and securing the manifold body 108 in place within the frozen beverage equipment 602 or soft-serve ice cream equipment 604. Such fasteners can be fastener 116 such as a screw or bolt, or other types and kinds of fasteners, as may be required and or desired in a particular embodiment.

Figure 7:
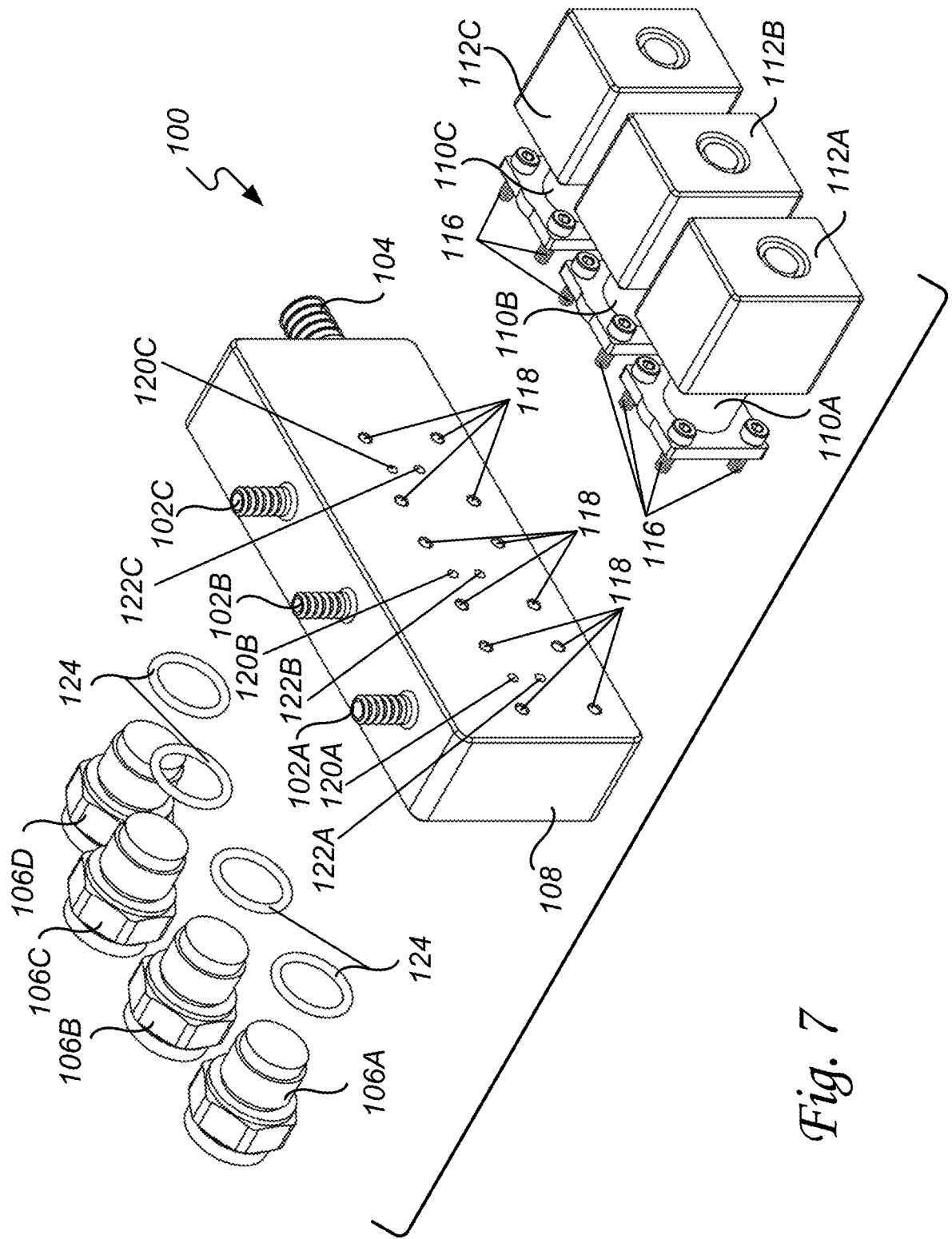
FIGS. 7-8 illustrate examples of a disassembled ingredient blending manifold.
Figure 8:
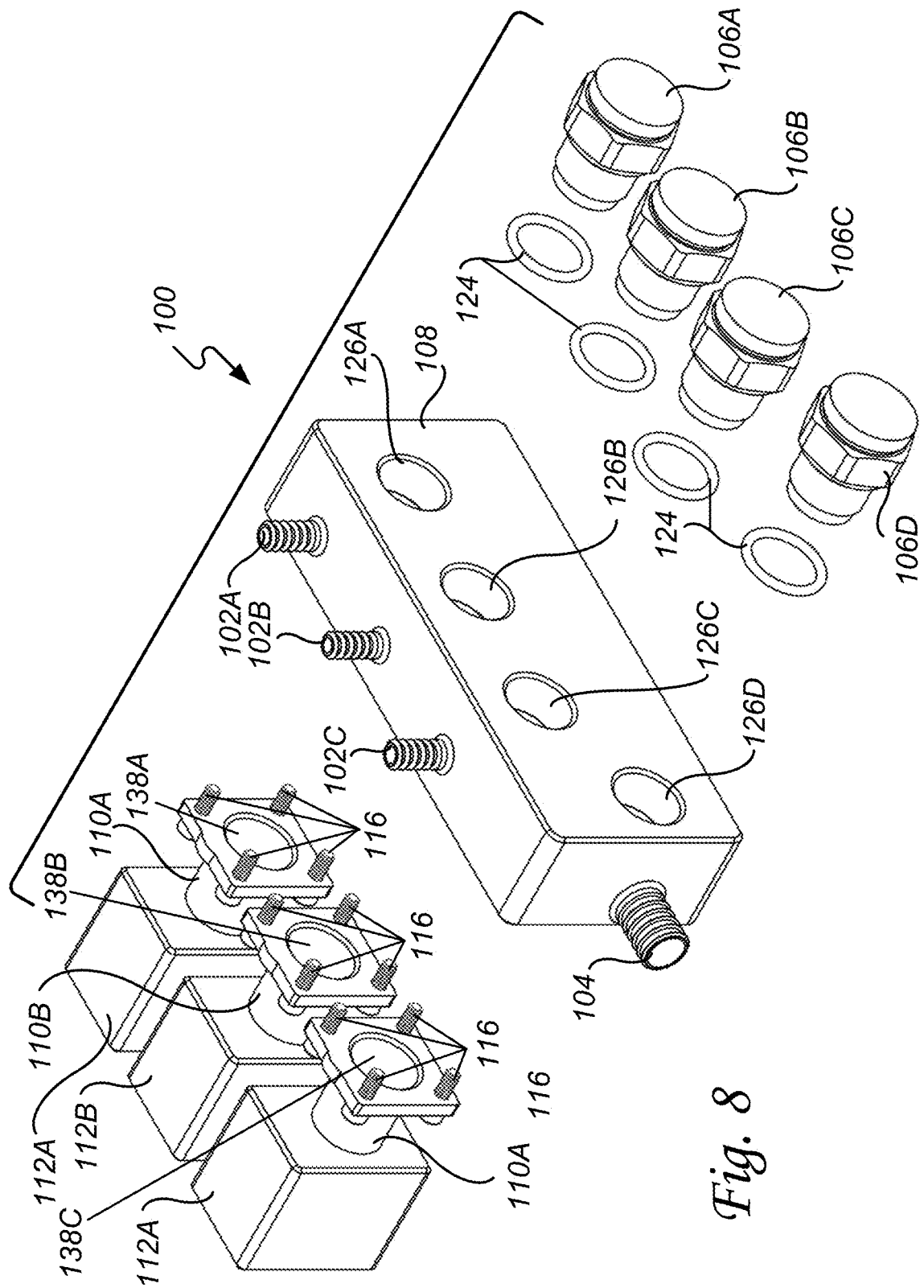

Referring to FIGS. 7 and 8 there is illustrated a top front side perspective view in FIG. 7 and a top backside perspective view of a disassembled ingredient blending manifold 100. With reference to FIG. 7, in an exemplary embodiment, mounting holes 118 can be threaded and positioned to engage fasteners 116 such as a screw or bolt in a manner that secures the electronic valve 110A-C/112A-C to the front side surface of the manifold body 108. Additionally, an o-ring 124 can be placed around each of the pressure sensors 106A-D when the pressure sensors 106A-D are secured to the manifold body 108. In this regard, the o-rings 124 prevent the ingredient 210/212/214 from leaking from the pressure reservoirs 126A-C under the pressure sensors 106A-C and from leaking from the blending chamber 128 that passes under the pressure sensor 106D.

The manifold body 108 has more than one ingredient egress port 120A-C that connects the front surface to the pressure reservoir 126A-C and more than one ingredient ingress port 122A-C that connects the front surface to the blending chamber 128. When secured to the manifold body, each of the electronic valves 110A-C/112A-C covers an ingredient egress port 120A-C and an ingredient ingress port 122A-C.

In this regard and with reference to FIG. 8, an ingredient 210/212/214 can be injected into an inlet conduit 102A-C and travels along the ingredient inlet port 130/132/134 pathway into the pressure reservoir 126 A-C. In the 'CLOSED' position the electronic valve 110A-C/112A-C blocks the ingredient egress port 120A-C preventing the ingredient 210/212/214 from exiting the pressure reservoir 126A-C. In the 'OPEN" position such as when energized, the electronic valve 110A-C/112A-C retracts creating a temporary ingredient transfer void 138A-C under the electronic valve 110A-C/112A-C that allows the ingredient 210/212/214 to exit the ingredient egress port 120A-C and traverse along the surface of the front side under the electronic switch 110A-C/112A-C contained within the ingredient transfer void 138A-C as not to leak, exiting the ingredient egress port 120A-C and entering the ingredient ingress port 122A-C.

Figure 9:
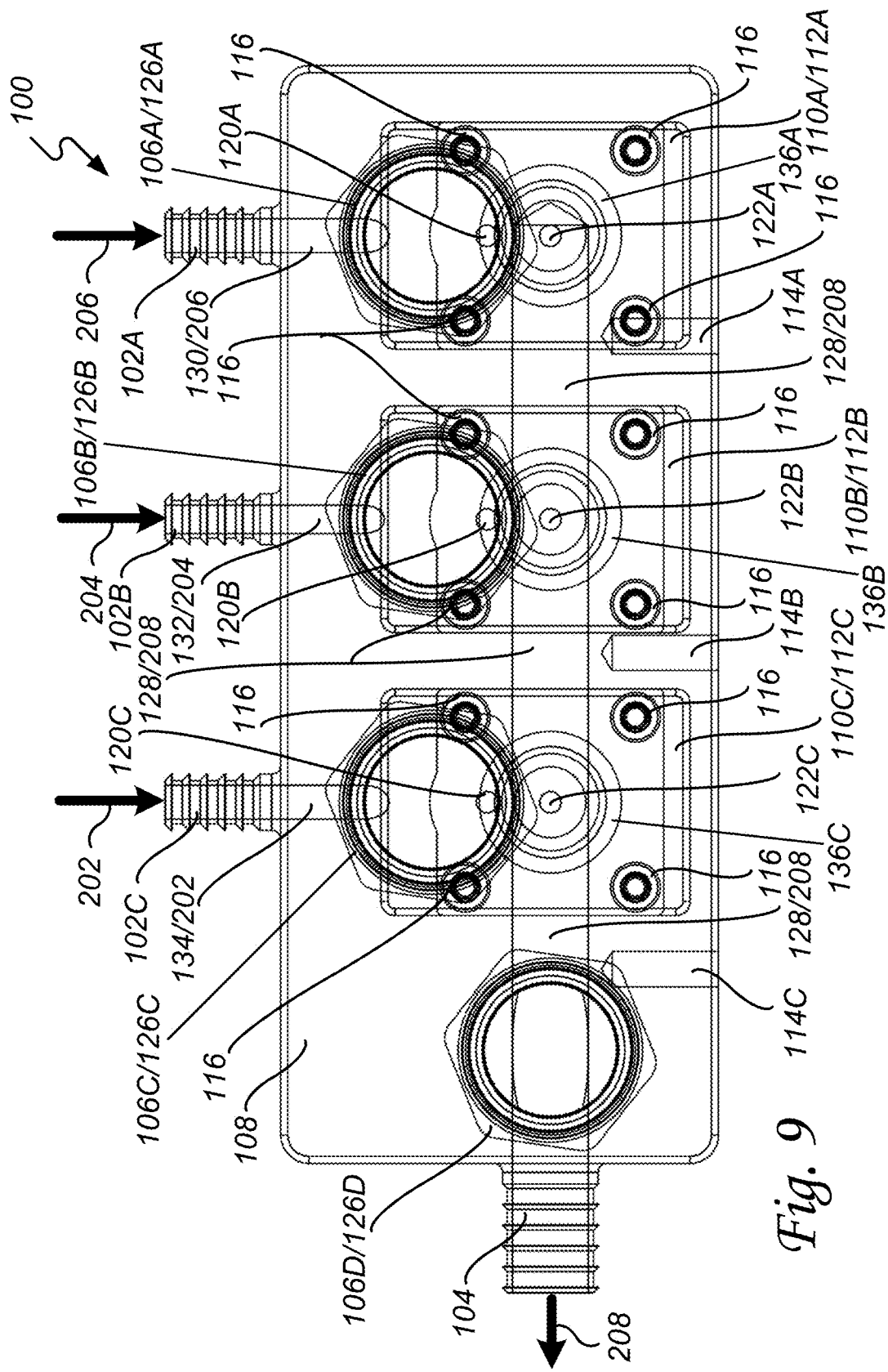
FIG. 9 illustrates one example of an inside view of an ingredient blending manifold that shows the internal ingredient flow and blending chamber pathways.

In operation and with reference to at least FIG. 9, when the electronic valve 110A-C/112A-C is in the 'OPEN' position the ingredient 210/212/214 passes from the pressure reservoir 126A-C out of the ingredient egress port 120A-C, along the front side of the manifold body 108 under the electronic valve 110A-C/112A-C, through the ingredient ingress port 122A-C, and into the blending chamber 108 forming the food product 208. And when the electronic valve 110A-C/112A-C is in the 'CLOSED' position the ingredient 210/212/214 is prevented from egressing, from the pressure reservoir 126A-C, through the ingredient egress port 120A-C.

Referring to FIG. 9, there is illustrated one example of an inside view of an ingredient blending manifold 100 that shows the internal ingredient flow and blending chamber 128 pathways. In an exemplary embodiment, an ingredient blending system 100/500 can be used in frozen beverage equipment 602 and soft-serve ice cream equipment 604. The ingredient blending system 100/500 comprises a manifold body 108 having at least one blending chamber 128, a front side, a backside, and a top side. The top side has more than one ingredient inlet port 102A-C. The backside has more than one pressure reservoir 126A-D. The front side has more than one ingredient egress port 120A-C that intersects the pressure reservoir 126A-C and more than one ingredient ingress port 122A-C that intersects the blending chamber 128.

More than one of an inlet conduit 102A-C is fastened to each of the ingredient inlet port 130/132/134 wherein an ingredient supply line 210/212/214 can be interconnected with the inlet conduit 102A-C and supplies one or more of an ingredient 202/204/206 by injecting the ingredient 202/204/206 into the manifold body 108 through the ingredient inlet port 102A-C.

More than one pressure sensor 106A-D is secured within each of the pressure reservoirs 126A-D. The ingredient inlet ports 130/132/134 intersect the pressure reservoir 126A-C allowing the ingredients 202/204/206 to enter the pressure reservoir 126A-C. The blending chamber 128 intersects more than one of the pressure sensor reservoirs 126A-C.

More than one electronic valve 110A-C/112A-C is secured to the front side of the manifold body 108 such that when the electronic valve 110A-C/112A-C is in the 'OPEN' position the ingredient 202/204/206 passes from the pressure reservoir 126A-C out of the ingredient egress port 120A-C, along the front side of the manifold body 108 under the electronic valve 110A-C/112A-C through the ingredient ingress port 122A-C and into the blending chamber 128 forming a food product 208. And, when the electronic valve 110A-C/112A-C is in the 'CLOSED' position the ingredient 202/204/206 is prevented from egressing the pressure reservoir 126A-C through the ingredient egress port 120A-C. At least one food product egress conduit 104 is fastened to the blending chamber 128 through which the food product 208 egresses the manifold body.

In an exemplary embodiment, the ingredients 202/204/06 traverse along the surface of the front side of the manifold body 108 between the ingredient egress port 120A-C and the ingredient ingress port 122A-C contained within an ingredient transfer void 136A-C that is temporarily created when the electronic valve 110A-C/112A-C is opened or otherwise energized.

In an exemplary embodiment, the manifold body 108 has a bottom side. The bottom side has at least one mounting hole 114A-C for receiving a fastener and securing the manifold body 108 in place within the frozen beverage equipment 602 or soft-serve ice cream equipment 604. The fastener can be a screw fastener such as fastener 116 or other types and kinds of fasteners, as may be required and/or desired in a particular embodiment.

In an exemplary embodiment, a food portion 204 is one of the ingredients and is interconnected by way of the ingredient supply line 212 with at least one of the inlet conduits 102B. A gas portion 202 is one of the ingredients and is interconnected by way of the ingredient supply line 210 with at least one of the inlet conduits 102C. The food product 208 comprises the gas portion 202 and the food portion 204.

In an exemplary embodiment, a water portion 206 is one of the ingredients and is interconnected by way of the ingredient supply line 214 with at least one of the inlet conduit 102A. The food product can comprise the water portion 206.

In an exemplary embodiment, a clean-in-place solution is interconnected with at least one of the inlet conduit 102A, wherein the ingredient blending system can be cleaned by injecting the clean-in-place solution. The clean-in-place solution can be a caustic solution, a mixture of a caustic solution and water, an aqueous ozonated water solution, or other types or kinds of solutions as may be required and/or desired in a particular embodiment.

Figure 10A:
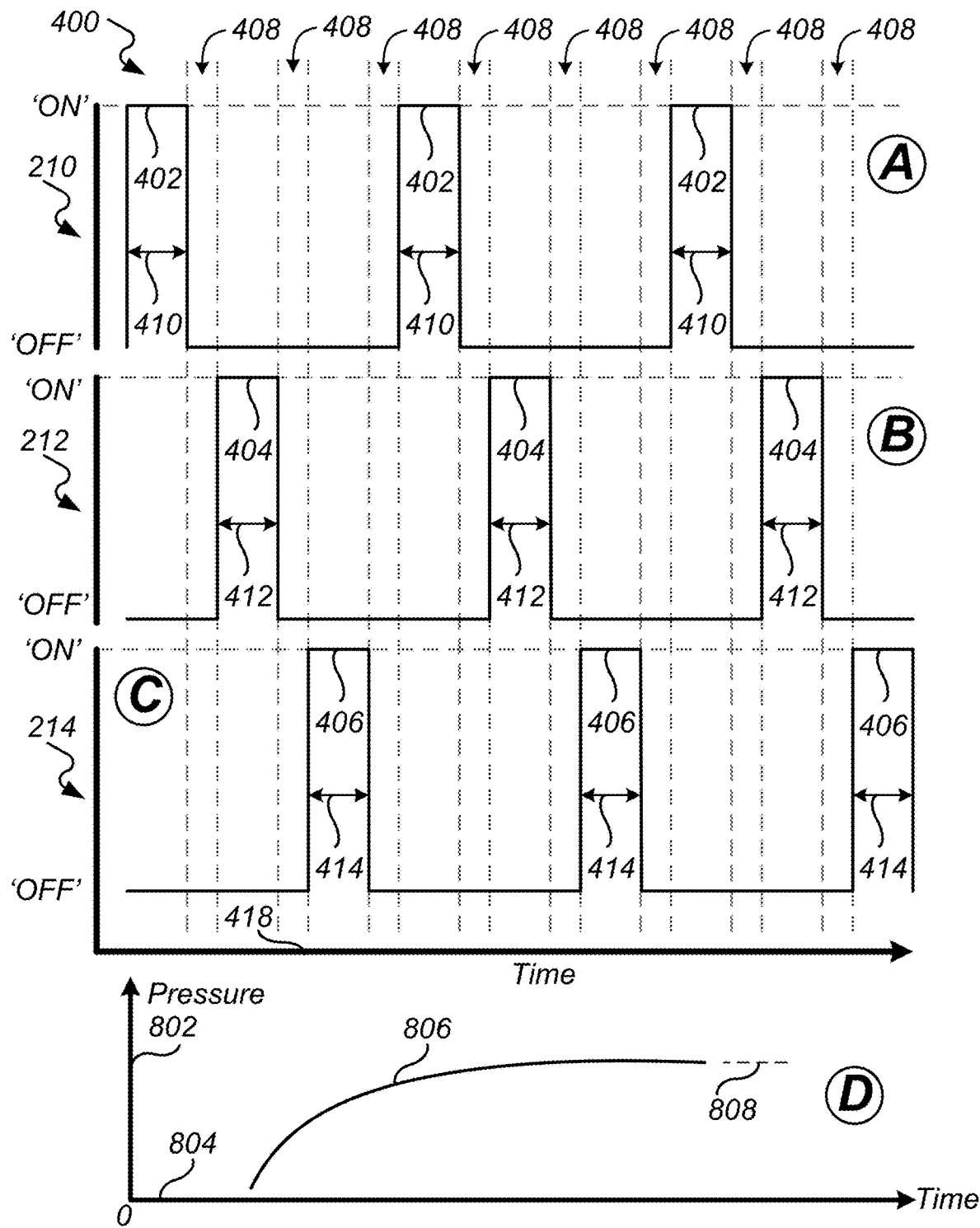
FIGS. 10A-B illustrate examples of a recipe pulse sequence.

Referring to FIG. 10A, there is illustrated one example of a recipe pulse sequence 400. In an exemplary embodiment, the recipe pulse sequence 400 is one or more of the electronic valves 110A-C/112A-C being energized and/or otherwise 'OPENED' for a predetermined amount of time to allow ingredients 210/212/214 to enter the blending chamber 128. A longer 'OPEN' predetermined amount of time allows more of the specific ingredient 210/212/214 to enter the blending chamber 128. By predetermining an amount of time for each ingredient 210/212/214 in a recipe, the ingredient amounts can be blended to form the food product 208. As an example, with pumps 552 and 554 providing comparable performance, a ratio of one part food portion 204, to two parts water portion 206 can be achieved by 'OPENING' electronic valve 110A/112A that controls the water portion 206 flow into the blending chamber 128 for twice the amount of time as the electronic valve 110B/112B that controls the flow of the food portion 202 into the blending chamber 128.

In a plurality of exemplary embodiment, the recipe pulse sequence 400 can be varied between at least some of the ingredients 210/212/214 based on the recipe concentrations, the pump performance characteristics, and other factors. Such ingredients can be liquids or gases and can be pumped, valve controlled, or metered 550/552/554, as may be required or desired for a particular recipe embodiment. For disclosure purposes, not all ingredients made be needed for every recipe. As an example, the water portion 206 may not be needed when the food portion 204 does not require to be diluted. Other ingredients may or may not be needed in other recipes, as may be desired and/or required in a particular embodiment.

With reference to FIG. 10A, there is illustrated a recipe pulse sequence 400. The recipe pulse sequence 400 can be represented as a square wave 402/404/406 that indicated a time period 418 that an electronic valve 110A-C/112A-C is energized 'ON' or 'OPEN' 410/412/414 to allow ingredient flow or in standby 'OFF' or "CLOSED" abating ingredient flow.

In an exemplary embodiment, in reference 'A' initially electronic valve 110C/112C is energized allowing ingredient 210 to enter the blending chamber 128 for a predetermined time period 410. The recipe pulse sequence 400 then continues in reference 'B' by energizing electronic valve 110B/112B allowing ingredient 212 to enter the blending chamber 128 for a predetermined time period 412. The recipe pulse sequence 400 then continues in reference 'C' by energizing electronic valve 110A/112A allowing ingredient 214 to enter the blending chamber 128 for a predetermined time period 414.

As the blending chamber 128 is filled the blended ingredients are conveyed through at least one tube to the product inlet 544 where the food product 208 enters the mixing cylinder 536 and is chilled and circulated by auger 534 into a frozen malleably consistency and dispensed by way of the dispense valve 548 by a user 302 or customer 304. The auger 534 is rotated by way of auger motor 532.

The recipe pulse sequence 400 repeats as needed. Each recipe pulse sequence 400 ratiometrically blends one or more of the various ingredients 210/212/214 by injecting them in predetermined quantities into the blending chamber 128 until the food product pressure 106 in the mixing cylinder 536 reaches a desired predetermined food product pressure 808. In an exemplary embodiment, such food product pressure 806 can be monitored by pressure sensor 106D. The predetermined food product pressure can be selected as part of configuring the frozen beverage equipment 602 or the soft-serve ice cream equipment 604.

In this regard, in an exemplary embodiment, a mixing cylinder 536 can be interconnected to the food product egress conduit 104 and receives the food product 208. The mixing cylinder 536 comprises an auger 534 that is interconnected with an auger motor for circulating the food product 208 within the mixing cylinder 536 and a dispense valve 548 for dispensing the food product 208 from the mixing cylinder 536.

A control system 500 comprises a microcontroller 502, a memory 504, a valve controller 512 that is operationally related to the electronic valve 110A-C/112A-C, and a pressure sensor controller 560 that is operationally related to the pressure sensors 106A-D. The memory 504, the valve controller 512, and the pressure sensor controller 560 are operationally related to the microcontroller 502. The memory 504 can be encoded with instructions that when executed by the microcontroller 502 perform the steps of determining a blending chamber 128 pressure by way of the pressure sensor 106D. The method continues by initiating a recipe pulse sequence 400 when the blending chamber pressure 806 is below a predetermined food product pressure 808. The recipe pulse sequence 400 operates one or more of the electronic valves 110A-C/112A-C in an 'ON' and 'OFF' manner in a predetermined sequence allowing predetermined portions of the ingredients 210/212/214 to enter the blending chamber 128. The method continues by terminating the recipe pulse sequence 400 when the blending chamber pressure 806 is at least the predetermined food product pressure 808. In operation, the mixing chamber 536 is continually refilled with blended food product 208 after each dispense of the food product 208 by way of the dispense valve 548.

In an exemplary embodiment, different ingredients 210/212/214 can be injected into the blending chamber 128 sequentially so as to not create variable pressure changes in the blending chamber 128 during ingredient injection. Such blending chamber 128 variable pressure changes by pumping more than one ingredient at a time into the blending chamber 128 can create ratio inaccuracies in the blended food product 208. As an example, trying to inject gas and liquid at the same time can create pressure variances within the blending chamber 128 that can lead to the blended food product 208 ingredient ratios being inaccurate.

An advantage, in the present invention, is that a food product pressure stabilization time period 408 can be added between each transition to a different electronic valve 110A-C/112A-C. The food product pressure stabilization time period 408 provides a brief predetermined time period between ingredient 210, 212/, or 214 injections into the blending chamber 128 to allow the pressure within the blending chamber 128 to stabilize before introducing the next ingredient 210/212/214 in the recipe pulse sequence 400. In operation, in this regard, the memory 504 can be encoded with instructions that when executed by the microcontroller 502 perform the step of adding a food product pressure stabilization time period 408 when the recipe pulse sequence 400 transitions between the electronic valves 110A-C/112A-C, wherein the blending chamber 128 pressure is allowed to stabilize before the next ingredient 210, 212, or 214 is added to the blending chamber 128.

In a plurality of recipe pulse sequences 400, not every ingredient 210/212/214 may be dispensed and/or the predetermined time period for each ingredient 210/212/214 dispensed may vary. Additionally, the food product pressure stabilization time period 408 can be the same between transitions to different ingredients or different, as may be required and/or desired in a particular embodiment.

In an exemplary embodiment, in reference 'D' there is illustrated a pressure 804 versus time 804 chart. In operation, as ingredients 210, 212, or 214 are blended by way of the recipe pulse sequence in the blending chamber 128, conveyed, and injected into the mixing cylinder 536 pressure sensor 106D will begin to record an increase in food product pressure 806. When the food product pressure 806 reaches the desired predetermined food product pressure 808 then the blending process is stopped until the food product pressure 806 falls below the desired predetermined food product pressure 808 at which point the recipe pulse sequence is restarted to refill the mixing cylinder 536 with food product 208 raising the food product pressure 806 until the desired food product pressure 808 is reached again. In this regard, the mixing cylinder 526 is maintained full of food product 208 at the desired predetermined food product pressure 808 which maintains product quality and better insures that when dispensed by user 302 or customer 304 for consumption purposes the food product 208 frozen malleable consistency is at an ideal viscosity.

In the present invention "ideal consistency" or "ideal viscosity" is related to food product 208 viscosity and intended to mean the predetermined frozen malleable consistency of the food product 208 which can be easily dispensed from the dispense valve 548 yet frozen enough to be non-runny and user 302 and/or customer 304 desirable for consumption. In this regard, the predetermined frozen malleable consistency can be selected by user 302 by configuring the frozen beverage equipment 602 and soft-serve ice cream equipment 604 and maintaining food product pressure 806 within the mixing cylinder 536 at the desired predetermined food product pressure 808.

Figure 10B:
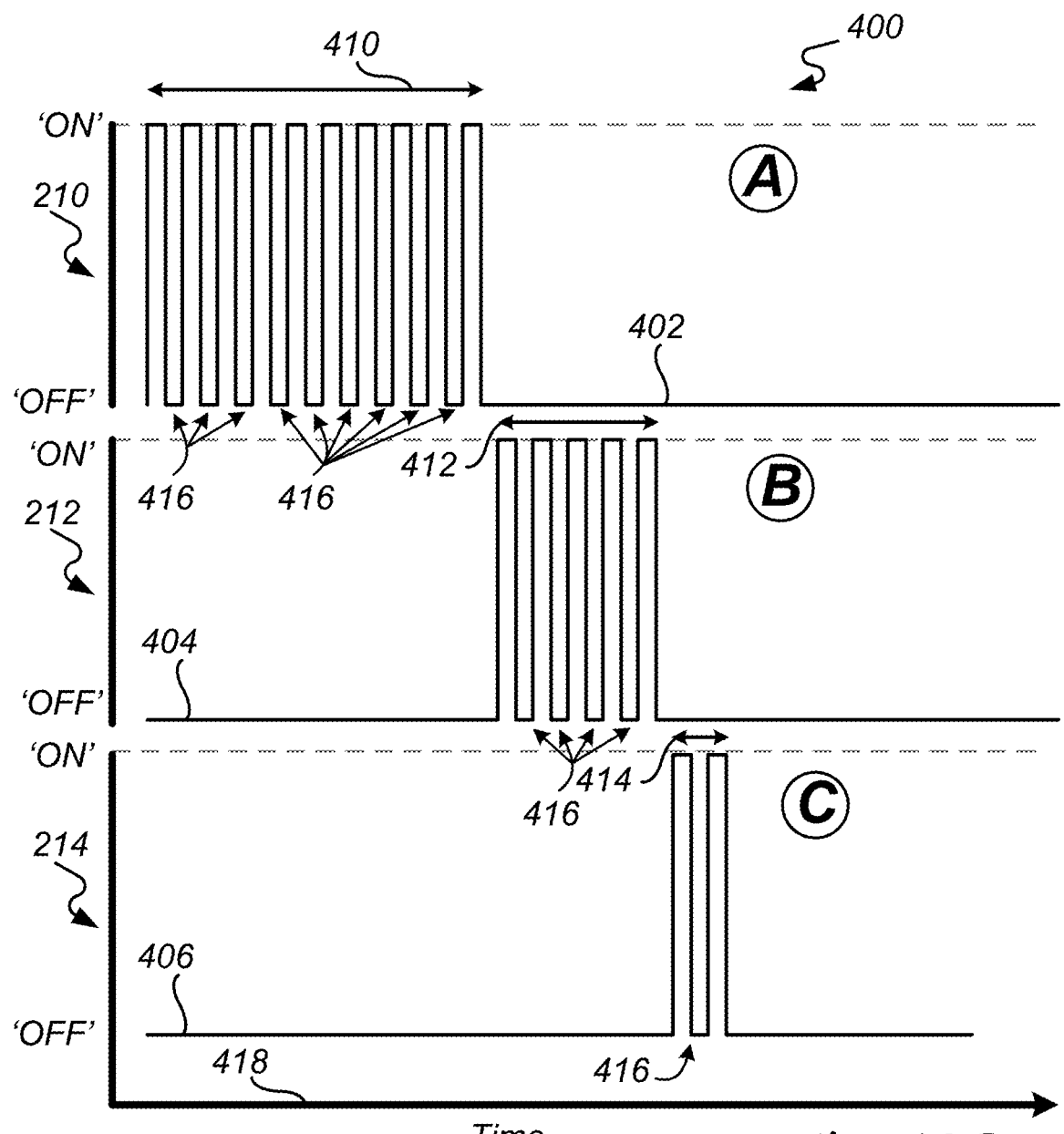

Referring to FIG. 10B, there is illustrated a recipe pulse sequence 400. The recipe pulse sequence 400 can be represented as a square wave 402/404/406 that indicates a time period 418 that an electronic valve 110A-C/112A-C is energized 'ON' or 'OPEN' 410/412/414 to allow ingredient flow or in standby 'OFF' or "CLOSED" abating ingredient 210/212/214 flow.

In an exemplary embodiment, a resting pulse period 416 can be integrated into the electronic valve 110A-C/112A-C energized 'ON' or 'OPEN' time periods 410/412/414. In this regard, the electronic valve 110A-C/112A-C energized 'ON' or 'OPEN' the ingredient 210/212/214 supply-side pressure can drop, and as a result inaccuracies in pumping or otherwise metering product amounts into the blending chamber 128 can occur. To allow ingredient 210/212/214 supply-side pressure to recover and the pressure reservoirs 126A-C to be refilled during an ingredient 210/212/214 injection into the blending chamber 128 thus maintaining a more stable ingredient 210/212/214 pressure during metering into the blending chamber 128 a resting pressure period 416 can be integrated into the electronic valve 110A-C/112A-C energized 'ON' or 'OPEN' time periods 410/412/414. In operation, the electronic valve 110A-C/112A-C energized 'ON' or 'OPEN' and 'OFF' or 'CLOSED' several times within the time periods 410/412/414. The 'OFF' or 'CLOSED' resting pulse period 416 allows the ingredient 210/212/214 pumps/metering devices 550/552/554 to recover and repressurize the ingredient 210/212/214 supply lines and refill the pressure reservoirs 126A-C.

In an exemplary embodiment, such resting pulse period 416 can be predetermined and set to occur each time an ingredient 210/212/214 is need to be injected into the blending chamber 128. In other exemplary embodiments, the pressure of each ingredient can be measured by way of pressure sensor 106A-D and the resting pulse period 416 inserted into the electronic valve 110A-C/112A-C energized 'ON' or 'OPEN' time periods 410 in reference 'A', 412 in reference 'B', and 414 in reference 'C' when the ingredient pressure 210, 212, or 214 respectively falls below a predetermined ingredient pressure level as measure by the pressure sensors 106A-C. The frequency and time period of the resting pulse period can also be dynamically determined based on pressure sensor 106A-C readings during ingredient 210/212/214 injection into the blending chamber 128.

In an exemplary embodiment, the recipe pulse pattern 400 square waves 402/404/406 resting pulse periods 416 for each of the electronic valve 110A-C/112A-C energized 'ON' or 'OPEN' time periods 410/412/414 can be dynamically machine-learned over time by correlating the pressure sensor 106A-C reading during ingredient 210/21/214 injection into the blending chamber over many mixing chamber 536 refills and for different recipe pulse patterns 400 and different ingredients 210/212/214, as may be required and/or desired in a particular embodiment.

In an exemplary embodiment, in operation, the memory 504 can be encoded with instructions that when executed by the microcontroller 502 perform the steps of inserting one or more of a resting pulse period 416 into the recipe pulse sequence 400 turning 'OFF' or 'CLOSING' the electronic valve 110A-C/112A-C. And, allowing during the resting pulse period 416 the pressure reservoir 126A-C to repressurize before turning the electronic valve 110A-C/112A-C back 'ON' or 'OPENING'.

Figure 10C:
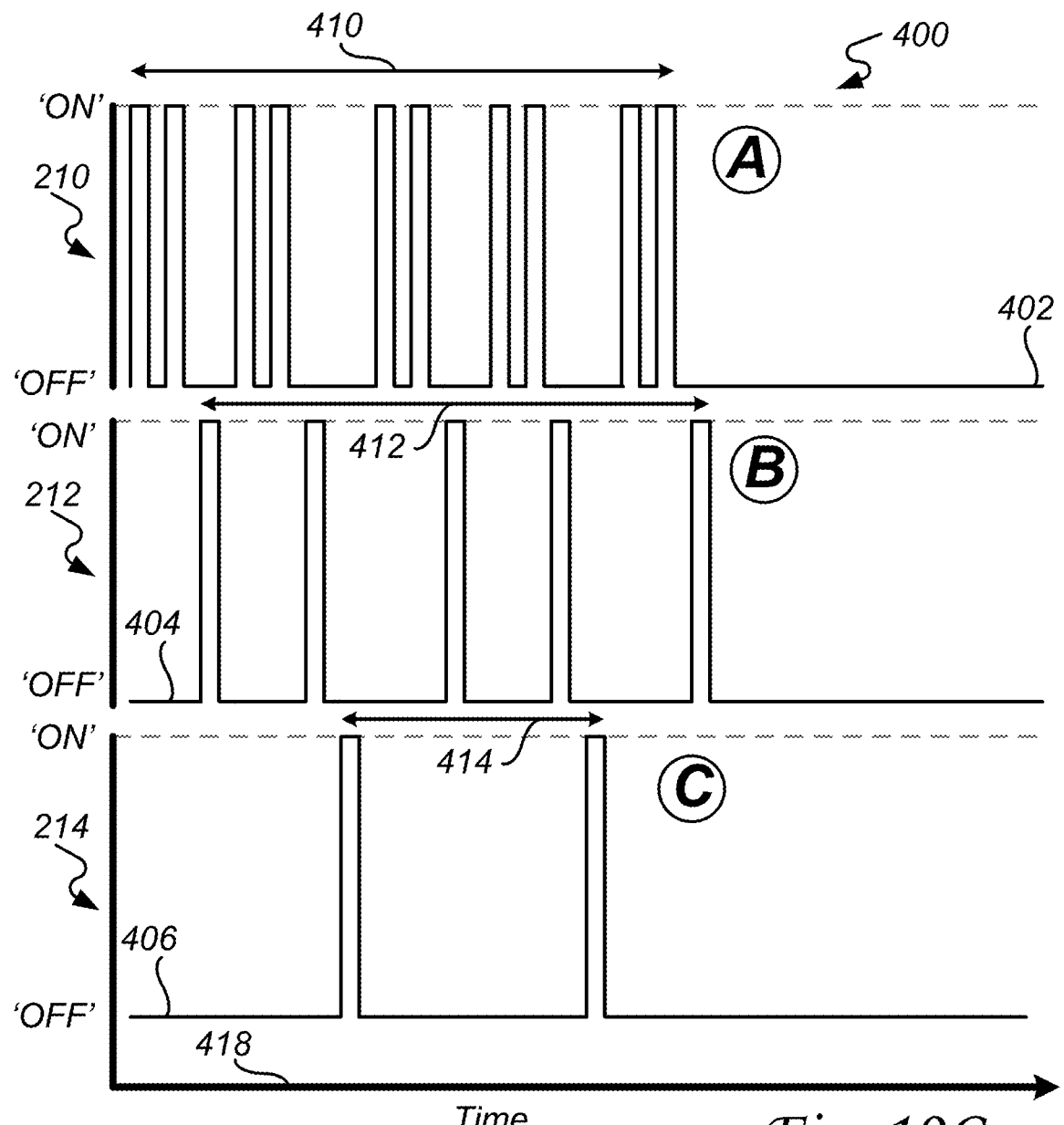
FIG. 10C illustrates one example of a subdivided recipe pulse sequence.

Referring to FIG. 10C, there is illustrated a recipe pulse sequence 400. The recipe pulse sequence 400 can be represented as a square wave 402/404/406 that indicates a time period 418 that an electronic valve 110A-C/112A-C is energized 'ON' or 'OPEN' 410/412/414 to allow ingredient 210/212/214 flow or in standby 'OFF' or "CLOSED" abating ingredient 210/212/214 flow.

In the present invention, the term "micro-blending" is intended to mean interspersing small portions of the ingredient 210/212/214 together in the blending chamber 128, increasing the surface area that each ingredient 210/212/214 is contacting each other ingredient 210/212/214.

In an exemplary embodiment, the mixing cylinder 536 can be filled with the food product 208 by dividing the recipe pulse sequence 400 into a subdivided recipe pulse sequence. The subdivided recipe pulse sequence can then be used to activate the electronic valve 110A-C/112A-C. The food product pressure 806 can be monitored by way of a pressure sensor 106D until the predetermined food product pressure 808 is reached. In this regard, the ingredients 202/204/206 are micro-blended in the blending chamber 128 to form the food product 208.

As an example, and not a limitation, with reference to FIG. 10C, in reference 'A' the recipe pulse sequence 400 is energizing 'ON' or 'OPEN' 410 electronic valve 110A/112A for ingredient 10 ten times, and in reference 'B' energizing 'ON' or 'OPEN' 412 electronic valve 110B/112B for ingredient 212 five times, and in reference 'C' energizing 'ON' or 'OPEN' 414 electronic valve 110C/112C for ingredient 214 two times.

Instead of operating the recipe pulse sequence 400, as illustrated in FIG. 10A, in a serial manner where 410 is initiated and completed, then 214 is initiated and completed, and then 414 is initiated and completed, the recipe pulse sequence 400 is subdivided and operated in a parallel manner. In this regard, in reference 'A' a portion of sequence 410 is completed and then in reference 'B' a portion of sequence 412 is completed, and then in reference 'A' a portion of sequence 414 is completed, repeating until the complete recipe pulse sequence 400 is completed. In this manner, a recipe pulse sequence 400 with:
10 pulses of 210/410 followed by;
8 pulses of 212/412 followed by;
2 pulses of 214/414;

can be transformed into a subdivided recipe pulse sequence 400 of:
2 pulses of 210/410 followed by;
1 pulse of 212/412 followed by;
2 pulses of 210/410 followed by;
1 pulse of 212/412 followed by;
1 pulse of 214/414 followed by;
2 pulses of 210/410 followed by;
1 pulse of 212/412 followed by;
2 pulses of 210/410 followed by;
1 pulse of 212/412 followed by;
1 pulse of 214/414 followed by;
2 pulses of 210/410 followed by;
1 pulse of 212/412.

An advantage in the present invention is that by converting a recipe pulse sequence 400 into a subdivided recipe pulse sequence 400 the ingredients are micro-blended by interspersing smaller portions of the ingredient 210/212/214 together in blending chamber 128. Such a subdivided recipe pulse sequence 400 micro-blending technique can create more surface area for the ingredients to contact each other which can promote things like better diffusion of gasses into the food product 208. Such better diffusion can aid in carbonation, and other aspects of gas mixing including dissolving, imbibing, entraining, and other gas-liquid interactions. Such other micro-blending advantages can include flavor dispersion, more rapid chilling and stirring once in the mixing cylinder 536, and other micro-blending advantages.

Figures 11, 12:
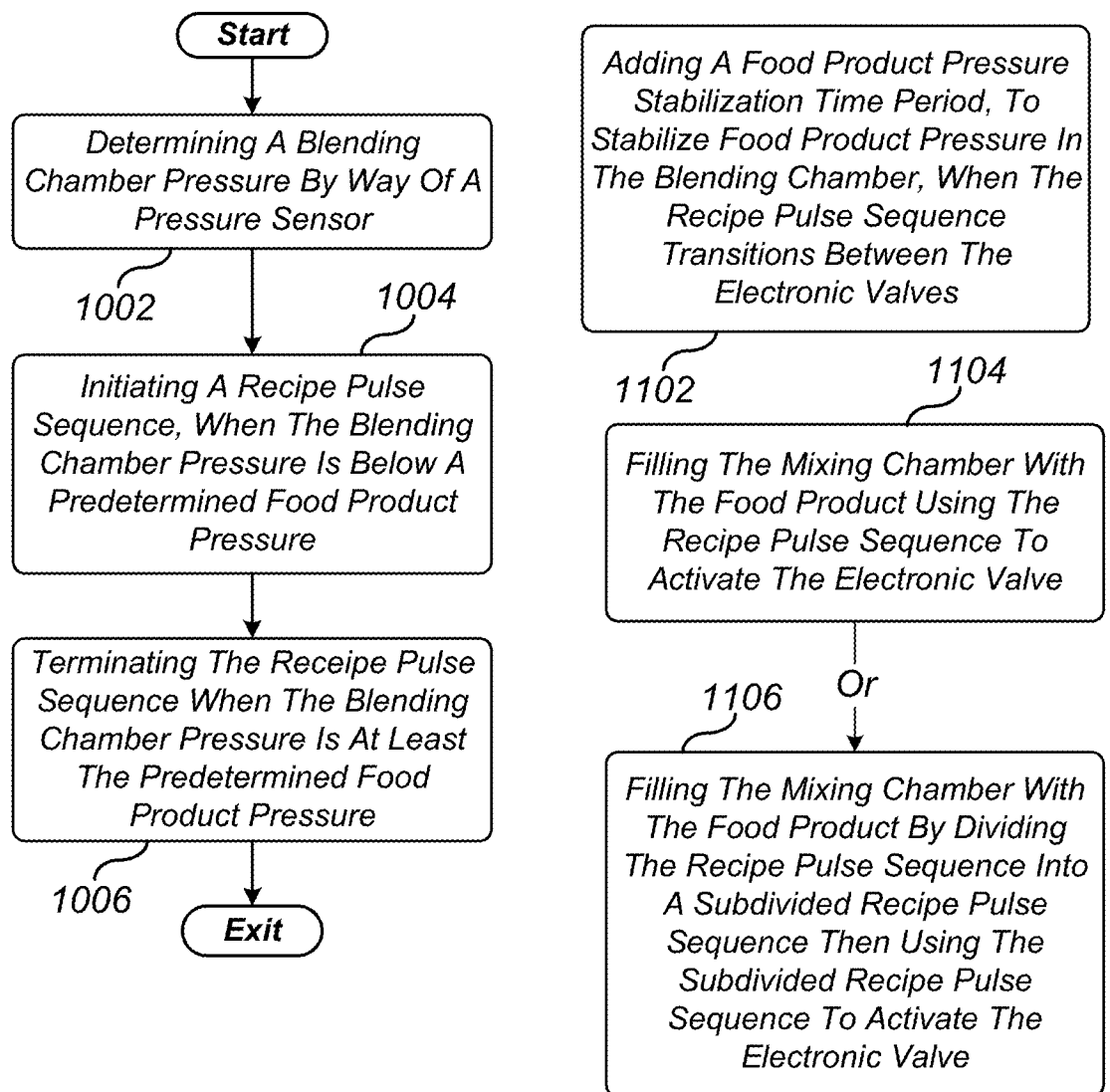
FIG. 11 illustrates one example of an ingredient blending method.
FIGS. 12-13 illustrates exemplary embodiments that can interchangeably be used with the methods of the present invention.

Referring to FIG. 11, there is illustrated one example of an ingredient blending method. In an exemplary embodiment, an ingredient blending method for use in frozen beverage equipment 602 and soft-serve ice cream equipment 604 begins in step 1002.

In step 1002, a food product pressure 806 is determined by way of a pressure sensor 106A-C. A manifold body 108 has at least one blending chamber 128, a front side, a backside, and a top side. The top side has more than one ingredient inlet port 130/132/134. The backside has more than one pressure reservoir 126A-D. The front side has more than one ingredient egress port 120A-C that intersects the pressure reservoirs 126A-C and more than one ingredient ingress port 122A-C that intersects the blending chamber 128.

More than one inlet conduit 120A-C can be fastened to each of the ingredient inlet ports 130/132/134. An ingredient supply line 210/212/214 can be interconnected with the inlet conduit 120A-C and supplies one or more of an ingredient 202/204/206 by injecting the ingredient 202/204/206 into the manifold body 108 through the ingredient inlet port 130/132/134.

More than one of the pressure sensors 106A-D can be secured within each of the pressure reservoirs 126A-D. The ingredient inlet port 130/132/134 intersects the pressure reservoirs 126A-C allowing the ingredients 210/212/214 to enter the pressure reservoirs 126A-C. The blending chamber 128 can intersect at least one of the pressure sensor reservoirs.

More than one electronic valve 110A-C/120A-C can be secured to the front side of the manifold body 108 such that when the electronic valve 110A-C/112A-C is in the 'ON or 'OPEN' position the ingredient 210/212/214 passes from the pressure reservoir 126A-C out of the ingredient egress port 120A-C, along the front side of the manifold body 108 under the electronic valve 110A-C/112A-C, through the ingredient ingress port 122A-C, and into the blending chamber 128 forming a food product 208. And, when the electronic valve 110A-C/112A-C is in the 'OFF' or 'CLOSED' position the ingredient 210/212/214 is prevented from egressing from the pressure reservoir 126A-C through the ingredient egress port 120A-C. At least one food product egress conduit 104 is fastened to the blending chamber 128 through which the food product 208 egresses the manifold body 108. The method then moves to step 1004.

In step 1004, a recipe pulse sequence 400 is initiated when the food product pressure 806 is below a predetermined food product pressure 808. The recipe pulse sequence 400 operates the electronic valves 110A-C/112A-C in an 'ON' or 'OPEN' and 'OFF' or 'CLOSED' manner in a predetermined sequence allowing predetermined portions of the ingredients 210/212/206 to enter the blending chamber 128. The method then moves to step 1006.

In step 1006, the recipe pulse sequence 400 is terminated when the food product pressure 806 is at least the predetermined food product pressure 808. The method is then exited.

In an exemplary embodiment, in operation, a mixing cylinder 536 is interconnected to the food product egress conduit 104 and receives the food product 208. The mixing cylinder 536 comprises an auger 534 for circulating the food product 208 within the mixing cylinder 536 and a dispense valve 548 for dispensing the food product 208 from the mixing cylinder 536.

A control system 500 comprises a microcontroller 502, a memory 504, a valve controller 512 that is operationally related to the electronic valve 110A-C/112A-C, and a pressure sensor controller 560 that is operationally related to the pressure sensor 106A-D. The memory 504, the valve controller 512, and the pressure sensor controller 560 are operationally related to the microcontroller 502.

The memory 504 is encoded with instructions that when executed by the microcontroller 502 perform the steps of determining a food product pressure 806 by way of the pressure sensor 106D. Initiating a recipe pulse sequence 402/402/406, when the food product pressure 806 is below a predetermined food product pressure 808. The recipe pulse sequence 402/404/406 operating the electronic valves 110A-C/112A-C in an 'ON' and 'OFF' manner in a predetermined sequence allowing a predetermined portion of the ingredients 210/212/214 to enter the blending chamber 128. And terminating the recipe pulse sequence 402/404/406 when the food product pressure 806 is at least the predetermined food product pressure 808.

Referring to FIG. 12, there are illustrated exemplary embodiments that can interchangeably be used with the methods of the present invention.

In step 1102, a food product pressure stabilization time period 408 is added to the to the recipe pulse sequence 400, to stabilize food product pressure 806 in the blending chamber 128, when the recipe pulse sequence 400 transitions between one or more of the electronic valve 110A-C/112A-C. In this regard, the food product pressure 806 is allowed to stabilize before the next one or more of the ingredients 210/212/214 are added to the blending chamber 128.

The ingredient blending method can transition between steps 1104 and 1106. In step 1104, the mixing cylinder 536 is filled with food product 208 using the recipe pulse sequence 400 to activate the electronic valves 110A-C/112A-C and monitor the food product pressure 806 until the predetermined food product pressure 808 is reached. Or, in step 1106 the mixing cylinder 536 is filled with the food product 208 by dividing the recipe pulse sequence 400 into a subdivided recipe pulse sequence as better illustrated in at least FIG. 10C. The subdivided recipe pulse sequence is then used to activate the electronic valve 110A-C/112A-C and monitor the food product pressure 806 until the predetermined food product pressure 808 is reached. In this regard, micro-blending of the ingredients 210/212/214 is improved.

Figure 13:
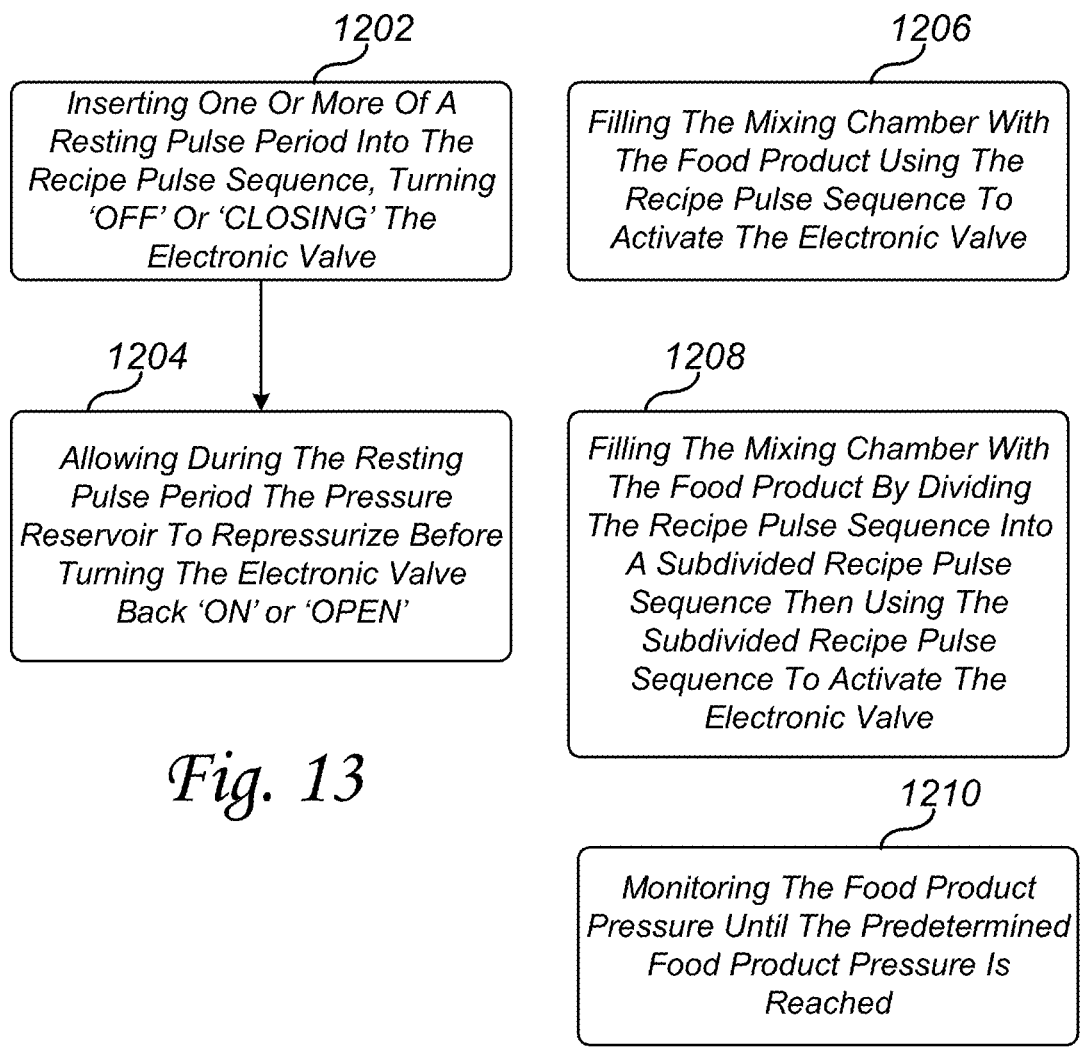

Referring to FIG. 13, there is illustrated an exemplary embodiment that can interchangeably be used with the methods of the present invention. The ingredient blending method performs steps 1202 and 1204. In step 1202, one or more of a resting pulse period 416 can be inserted into the recipe pulse sequence 400 turning 'OFF' or 'CLOSING' the electronic valve 110A-C/112A-C. And in step 1204, during the resting pulse period 416 the pressure reservoir 126A-C is allowed to repressurize before turning the electronic valve 110A-C/112A-C back 'ON' or 'OPENING. Such resting pulse period 416 can range from millisecond to seconds depending on how quickly after electronic valve 110A-C/112A-C 'OFF'' or 'CLOSING' the pressure reservoir 126A-C repressurizes.

In step 1206, the mixing cylinder 536 is filled with food product 208 using the recipe pulse sequence 400 to activate the electronic valves 110A-C/112A-C and monitor the food product pressure 806 until the predetermined food product pressure 808 is reached.

In step 1208, the mixing cylinder 536 is filled with the food product 208 by dividing the recipe pulse sequence 400 into a subdivided recipe pulse sequence as better illustrated in at least FIG. 10C. The subdivided recipe pulse sequence is then used to activate the electronic valve 110A-C/112A-C and monitor the food product pressure 806 until the predetermined food product pressure 808 is reached. In this regard, micro-blending of the ingredients 210/212/214 is improved.

In step 1210, the food product pressure is monitored until the predetermined food product pressure is reached or otherwise achieved.

Referring to FIG. 14, there is illustrated one example of a method of blending ingredients for use in frozen beverage equipment or soft-serve ice cream equipment. In an exemplary embodiment, the method begins in step 1302 by drawing ingredients through a manifold body 108 using a pump 550 connected to an egress port 104. The manifold body 108 comprises a blending chamber 128, a plurality of ingredient egress ports 120A-C, a plurality of ingredient ingress ports 122A-C, a plurality of pressure reservoirs 126A-C, and a plurality of inlet conduits 102A-C. The pump 550 creates suction, effectively pulling the ingredients from the inlet conduits 102A-C through the pressure reservoirs 126A-C and into the blending chamber 128. This step ensures the system operates without the need for positive pressure pumps, simplifying the system design and enhancing reliability. The suction-driven operation also minimizes the risk of ingredient contamination by maintaining a closed system, which is critical for food safety and hygiene.

In step 1304, at least one ingredient egress port 120A-C is maintained in a permanently open state using a valve cap 140. The valve cap 140 is configured to provide continuous fluid communication between the corresponding egress port 120A-C and ingress port 122A-C, enabling a consistent flow of ingredients. This configuration eliminates the need for electronic control mechanisms for the permanently open port, reducing system complexity and maintenance requirements. Additionally, the use of valve caps 140 simplifies the overall system by providing a passive flow control mechanism, which improves reliability and reduces the likelihood of component failure in high-demand environments. This step is particularly beneficial for applications requiring constant ingredient flow, such as maintaining a steady supply of base mixtures for frozen beverages.

Step 1306 involves configuring the diameters of the ingredient egress ports 120A-C and the corresponding ingredient ingress ports 122A-C to achieve ratiometric mixing. By carefully selecting port dimensions, the system ensures precise control over the proportions of each ingredient entering the blending chamber 128. For example, a smaller diameter egress port 120C may be used for a gas portion, while larger diameters may accommodate liquid ingredients with higher flow requirements. This configuration allows for consistent mixing ratios tailored to the desired product specifications. Additionally, the ability to adjust port dimensions enables the system to accommodate a wide range of ingredient viscosities and flow characteristics, providing versatility in product formulation. This step ensures that each ingredient contributes to the final product in the intended proportions, which is essential for maintaining flavor, texture, and quality.

In step 1308, the ingredients are blended within the blending chamber 128 to form a food product 208. The blending chamber 128 is designed to ensure thorough mixing of all ingredients 202/204/206, leveraging the suction-driven flow and the ratiometric configuration of the ports. This step produces a homogenous mixture that meets the required quality and consistency standards for frozen beverages or soft-serve ice cream products. The design of the blending chamber 128 minimizes dead zones where ingredients could accumulate, ensuring uniformity throughout the product. Additionally, the chamber's construction materials are chosen for durability and food safety, further enhancing the system's reliability in commercial applications.

The method utilizes an ingredient blending system having a manifold body 108, blending chamber 128, and pump 550 configured to draw ingredients through the manifold body 108 by suction. This approach streamlines the blending process, reduces operational complexity, and ensures consistent product quality. The suction-based operation not only eliminates the need for positive pressure pumps but also reduces energy consumption, making the system more cost-effective and environmentally friendly. Furthermore, the system's modular design allows for easy scalability, enabling manufacturers to adapt the method to various production volumes and ingredient types. This adaptability makes the method suitable for a wide range of applications, from small-scale artisan operations to large-scale commercial production.

Referring to FIG. 15, there is illustrated exemplary embodiments that can interchangeably be used with the methods of the present invention.

In step 1402, at least one pressure sensor 106A-D can be replaced with a sensor cap 142A-D to simplify the ingredient blending system. The manifold body 108 includes one or more pressure sensors 106A-D associated with the pressure reservoirs 126A-C to monitor ingredient pressure. By replacing selected pressure sensors 106A-D with sensor caps 142A-D, the system reduces reliance on electronic components, lowering costs and improving durability. Sensor caps 142A-D maintain the integrity of the pressure reservoirs 126A-C, allowing fluids to accumulate and flow as required without electronic monitoring. This modification is particularly advantageous in high-demand environments where minimizing maintenance and increasing system reliability are critical. The simplicity of sensor caps 142A-D also makes them an ideal solution for applications that do not require real-time pressure monitoring, further enhancing the ingredient blending system's adaptability.

In step 1404, the flow of ingredients is selectively controlled using one or more electronic valves 110A-C disposed on the ingredient egress ports 120A-C. The manifold body 108 includes the electronic valves 110A-C, which are configured to regulate the flow of specific ingredients dynamically. This step allows precise control over ingredient flow rates, enabling adjustments in real-time to accommodate varying product formulations or operational requirements. The use of electronic valves 110A-C provides enhanced flexibility, allowing operators to activate or deactivate specific ingredient lines as needed. This capability is particularly useful in applications requiring frequent changes in ingredient ratios or flow patterns, such as producing customized food products. Additionally, the integration of electronic valves 110A-C ensures consistency in ingredient delivery, reducing variability and improving overall product quality. By leveraging the selective control capabilities of electronic valves 110A-C, the system achieves greater adaptability and precision, making it suitable for high-performance food and beverage production environments.

In step 1406, ingredient pressure within the pressure reservoirs 126A-C is monitored using one or more pressure sensors 106A-D. The manifold body 108 further comprises these pressure sensors 106A-D associated with the ingredient egress ports 120A-C to provide real-time feedback on the internal pressure of the system. This step ensures that the pressure levels are maintained within optimal ranges, preventing disruptions in ingredient flow or inconsistencies in product quality. The data collected by the pressure sensors 106A-D can be used to dynamically adjust the operation of the pump 550 or electronic valves 110A-C to ensure smooth system performance. This monitoring capability is particularly valuable in applications where precise ingredient delivery is critical, such as maintaining consistent texture and flavor in frozen beverages or soft-serve ice cream. Additionally, the integration of pressure sensors 106A-D enhances system reliability by providing early detection of potential blockages or pressure imbalances, enabling proactive maintenance and minimizing downtime.

In step 1408, a cleaning solution is introduced into the manifold body 108 through one or more inlet conduits 102A-C to clean the ingredient blending system. This step involves circulating the cleaning solution through the pressure reservoirs 126A-C, ingredient egress ports 120A-C, and blending chamber 128 to remove any residue or contaminants. The suction generated by the pump 550 ensures thorough distribution of the cleaning solution throughout the system, reaching all critical components. This cleaning process is designed to minimize downtime and labor requirements by eliminating the need for disassembly. Additionally, the use of food-safe cleaning solutions ensures compliance with hygiene standards, making the system suitable for high-demand commercial environments. By integrating this cleaning step into the operational workflow, the system maintains consistent performance and reduces the risk of cross-contamination between production cycles.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer-readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. An ingredient blending system for use in frozen beverage equipment or soft-serve ice cream equipment, the system comprising:
   a manifold body, the manifold body comprising:
      a blending chamber;
      an egress port;
      a plurality of ingredient egress ports; and
      a plurality of ingredient inlet ports, each interconnected to a corresponding inlet conduit;
      wherein one or more ingredients are connected to corresponding inlet ports;
      wherein the blending chamber receives the ingredients from the plurality of ingredient egress ports to form a food product;
   at least one valve cap disposed on an ingredient egress port, the valve cap configured to maintain the corresponding ingredient egress port in a permanently open state to facilitate ratiometric mixing of ingredients based on port dimensions; and
   a pump operatively connected to the egress port of the manifold body to create suction, thereby drawing the food product through the manifold body.

2. The ingredient blending system of claim 1, wherein at least one electronic valve is disposed on an ingredient egress port to selectively control the flow of an ingredient into the blending chamber.

3. The ingredient blending system of claim 1, wherein the diameters of the ingredient egress ports and the corresponding ingredient ingress ports are configured to control the ratios of the ingredients entering the blending chamber.

4. The ingredient blending system of claim 1, wherein the manifold body having a plurality of pressure reservoirs, and the system further comprising one or more pressure sensors disposed within the pressure reservoirs to monitor the pressure of the ingredients prior to entering the blending chamber.

5. The ingredient blending system of claim 1, wherein at least one pressure sensor is replaced with a sensor cap, the sensor cap maintaining the integrity of the pressure reservoir without electronic monitoring.

6. The ingredient blending system of claim 1, wherein the pump creates a negative pressure, within the blending chamber, to draw the ingredients into the blending chamber.

7. The ingredient blending system of claim 1, wherein the valve caps are configured to replace electronic valves to simplify the system and reduce electronic components.

8. The ingredient blending system of claim 1, wherein the blending chamber is configured to mix the ingredients in predefined ratiometric proportions, determined by the dimensions of the corresponding ports.

9. The ingredient blending system of claim 1, wherein the suction created by the pump eliminates the need for positive pressure pumps at the inlet conduits.

10. An ingredient blending system for use in frozen beverage equipment or soft-serve ice cream equipment, the system comprising:
    a manifold body with a blending chamber;
    a plurality of ingredient egress ports and corresponding ingredient ingress ports;
    a plurality of inlet conduits for receiving ingredients;
    wherein the blending chamber receives the ingredients to form a food product;
    at least one valve cap disposed on an ingredient egress port, the valve cap configured to maintain the corresponding port in a permanently open state for ratiometric mixing; and
    a pump operatively connected to an egress port of the manifold body to create suction, thereby drawing the food product through the manifold body.

11. The ingredient blending system of claim 10, wherein the diameters of the ingredient egress ports and the corresponding ingredient ingress ports are configured to control the ratios of the ingredients entering the blending chamber.

12. The ingredient blending system of claim 10, further comprising:
    a plurality of pressure reservoirs associated with the manifold body; and
    one or more pressure sensors disposed within the pressure reservoirs to monitor the pressure of the ingredients prior to entering the blending chamber.

13. The ingredient blending system of claim 10, wherein at least one pressure sensor is replaced with a sensor cap, the sensor cap maintaining the integrity of the pressure reservoir without electronic monitoring.

14. A method of using the ingredient blending system of claim 1, the method comprising:
    maintaining at least one of the plurality of ingredient egress ports in a permanently open state using one of the at least one valve cap;
    configuring the diameters of each of the plurality of ingredient egress ports or alternatively configuring the diameter of each of the plurality of ingredient ingress ports to achieve ratiometric mixing of the ingredients;
    drawing ingredients through the manifold body using the pump connected to the egress port; and
    blending the ingredients within the blending chamber to form the food product.

15. The method of claim 14, wherein the manifold body further comprising a plurality of pressure reservoirs and the method further comprising:
    replacing at least one pressure sensor with a sensor cap to simplify the ingredient blending system, wherein the manifold body further comprises one or more pressure sensors associated with the pressure reservoirs.

16. The method of claim 14, wherein the ingredients are drawn through the manifold body by suction instead of positive pressure.

17. The method of claim 14, further comprising selectively controlling the flow of ingredients using one or more electronic valves disposed on the ingredient egress ports, wherein the manifold body further comprises the one or more electronic valves associated with the ingredient egress ports.

18. The method of claim 14, further comprising:
    monitoring ingredient pressure within the pressure reservoirs using one or more pressure sensors, the manifold body further comprises the one or more pressure sensors associated with the ingredient egress ports.

19. The method of claim 14, wherein the blending chamber is configured to maintain predefined ratiometric proportions of ingredients during blending.

20. The method of claim 14, further comprising:
introducing a cleaning solution into the manifold body through one or more inlet conduits to clean the ingredient blending system.

* * * * *